United States Patent
Wang et al.

(10) Patent No.: US 12,207,080 B2
(45) Date of Patent: Jan. 21, 2025

(54) METHOD AND DEVICE FOR MULTICAST TRANSMISSION

(71) Applicant: Samsung Electronics Co., Ltd., Suwon-si (KR)

(72) Inventors: Hong Wang, Beijing (CN); Lixiang Xu, Beijing (CN); Weiwei Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 17/451,786

(22) Filed: Oct. 21, 2021

(65) Prior Publication Data
US 2022/0124583 A1    Apr. 21, 2022

(30) Foreign Application Priority Data

Oct. 21, 2020   (CN) .......................... 202011134044.5
Dec. 25, 2020   (CN) .......................... 202011562841.3

(51) Int. Cl.
*H04W 36/08*    (2009.01)
*H04W 4/06*     (2009.01)
*H04W 76/12*    (2018.01)

(52) U.S. Cl.
CPC ............ *H04W 76/12* (2018.02); *H04W 4/06* (2013.01)

(58) Field of Classification Search
None
See application file for complete search history.

(56) References Cited

U.S. PATENT DOCUMENTS

| | | | |
|---|---|---|---|
| 10,455,472 B2 | 10/2019 | Wu | |
| 2008/0310368 A1* | 12/2008 | Fischer | H04L 47/10 370/331 |
| 2010/0322197 A1* | 12/2010 | Adjakple | H04W 36/023 370/332 |
| 2018/0139665 A1* | 5/2018 | Park | H04W 36/0007 |
| 2019/0253945 A1 | 8/2019 | Paladugu et al. | |

FOREIGN PATENT DOCUMENTS

| | | | |
|---|---|---|---|
| EP | 3627893 A1 * | 3/2020 | ........... H04L 1/1642 |
| WO | 2018126905 A1 | 7/2018 | |
| WO | 2018/203739 A1 | 11/2018 | |

OTHER PUBLICATIONS

International Search Report and Written Opinion of the International Searching Authority in connection with International Application No. PCT/KR2021/014846 issued Jan. 27, 2022, 9 pages.
Huawei, "(TP for NR_IAB BL CR TS 38.473): Miscellaneous stage 3 correction", R3-204248, 3GPP TSG-RAN WG3 Meeting #108-e, online, Jun. 1-11, 2020, 29 pages.
Ericsson, "Early data forwarding and CU-UP DL transmission start/stop", R3-203800, 3GPP TSG-RAN WG3 Meeting #108-e, Online, Jun. 1-12, 2020, 4 pages.

(Continued)

*Primary Examiner* — Pamit Kaur

(57) ABSTRACT

The present disclosure provides a method and device for multicast transmission, wherein a method for multicast transmission performed by a first network device includes: receiving a first message for requesting handover from a second network device; transmitting a second message for responding to the first message to the second network device.

15 Claims, 10 Drawing Sheets

(56) References Cited

OTHER PUBLICATIONS

Supplementary European Search Report dated Mar. 4, 2024, in connection with European Patent Application No. 21883301.0, 15 pages.
Qualcomm Inc., "Loss-less handover procedure for NR multicast," R3-206177, 3GPP TSG-RAN WG3 Meeting #109e, eMeeting, Aug. 2020, 4 pages.
Oppo, "Discussion on mobility with MBS Service continuity," R2-2006802, 3GPP TSG-RAN WG2 Meeting #111 eMeeting, Aug. 2020, 5 pages.

\* cited by examiner

METHOD AND DEVICE FOR MULTICAST TRANSMISSION

CROSS-REFERENCE TO RELATED APPLICATIONS

This application is based on and claims priority under 35 U.S.C. § 119(a) of a China patent application number 202011134044.5, filed on Oct. 21, 2020, in the China Patent Office, and a China patent application number 202011562841.3, filed on Dec. 25, 2020, in the China Patent Office, the disclosure of each of which is incorporated by reference herein in its entirety.

BACKGROUND

1. Field

The present disclosure relates to wireless communication technology, in particular to a method and device for multicast transmission.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 giga-Hertz (GHz) bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as technologies connectivity network where humans generate and consume information, is now evolving to the Internet of things (IoT) where the cloud server has IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

SUMMARY

According to an aspect of the present disclosure, there is provided a method for multicast transmission performed by a first network device, comprising: receiving a first message for requesting handover from a second network device; and sending a second message for responding to the first message to the second network device.

According to an embodiment of the present disclosure, the first message includes: information about a SN of a multicast data packet transmitted by the second network device, and/or information about a forwarding proposal for a multicast service.

According to an embodiment of the present disclosure, the information about the sequence number (SN) of the multicast data packet transmitted by the second network device includes: SN information of packet data convergence protocol (PDCP) and/or SN information of general packet radio service (GPRS) tunnelling protocol user plane (GTP-U).

According to an embodiment of the present disclosure, the second message includes: information about a SN of a multicast data packet transmitted by the first network device, and/or information about an indication to accept a forwarding, According to an embodiment of the present disclosure, the information about the SN of the multicast data packet transmitted by the first network device includes: SN information of PDCP and/or SN information of GTP-U.

According to an embodiment of the present disclosure, it further comprises: receiving information about a SN of a multicast data packet transmitted by the second network device from the second network device, wherein the information about the SN of the multicast data packet transmitted by the second network device includes: SN information of PDCP and/or SN information of GTP-U.

According to an embodiment of the present disclosure, it further comprises: deciding the data that needs to be forwarded with reference to one or more of information about a SN of a multicast data packet transmitted by the first network device and information about a SN of a multicast data packet transmitted by the second network device.

According to an embodiment of the present disclosure, it further comprises: deciding to stop data forwarding; and notifying the second network device to stop the data forwarding.

According to another aspect of the present disclosure, there is provided a method for multicast transmission performed by a second network device, comprising: sending a first message for requesting a handover to a first network device; and receiving a second message for responding to the first message from the first network device.

According to an embodiment of the present disclosure, the first message includes: information about a SN of a multicast data packet transmitted by the second network device, and/or information about a forwarding proposal for a multicast service.

According to an embodiment of the present disclosure, the information about the SN of the multicast data packet transmitted by the second network device includes: SN information of PDCP and/or SN information of GTP-U.

According to an embodiment of the present disclosure, the second message includes: information about a SN of a multicast data packet transmitted by the first network device and/or information about an indication to accept a forwarding.

According to an embodiment of the present disclosure, the information about the SN of the multicast data packet transmitted by the first network device includes: SN information of PDCP and/or SN information of GTP-U.

According to an embodiment of the present disclosure, it further comprises: deciding the data that needs to be forwarded with reference to one or more of the information about a SN of a multicast data packet transmitted by the first network device and the information about a SN of a multicast data packet transmitted by the second network device.

According to an embodiment of the present disclosure, it further comprises: deciding to stop forwarding data.

According to an embodiment of the present disclosure, it further comprises: sending information about a SN of a multicast data packet transmitted by the second network device to the first network device, wherein the information about the SN of the multicast data packet transmitted by the second network device includes: SN information of PDCP and/or SN information of GTP-U.

According to another aspect of the present disclosure, there is provided a first network device for multicast transmission, comprising: a transceiver configured to receive and send signals; and a controller configured to perform the method according to respective embodiments of the present disclosure.

According to another aspect of the present disclosure, there is provided a second network device for multicast transmission, comprising: a transceiver configured to receive and send signals; and a controller configured to perform the method according to respective embodiments of the present disclosure.

According to another aspect of the present disclosure, there is provided a method, comprising: setting SN information of PDCP based on SN information of GTP-U according to one or more predetermined rules.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 to 11 discussed below and various embodiments for describing the principles of the present disclosure in this patent document are only for illustration and should not be interpreted as limiting the scope of the disclosure in any way. Those skilled in the art will understand that the principles of the present disclosure can be implemented in any suitably arranged system or device.

In order to meet an increasing demand for wireless data communication services since a deployment of 4G communication system, efforts have been made to develop an improved 5G or pre-5G communication system. Therefore, the 5G or pre-5G communication system is also called "beyond 4G network" or "post LTE system".

Wireless communication is one of the most successful innovations in modern history. Recently, a number of subscribers of wireless communication services has exceeded 5 billion, and it continues growing rapidly. With the increasing popularity of smart phones and other mobile data devices (such as tablet computers, notebook computers, netbooks, e-book readers and machine-type devices) in consumers and enterprises, a demand for wireless data services is growing rapidly. In order to meet rapid growth of mobile data services and support new applications and deployments, it is very important to improve efficiency and coverage of wireless interfaces. When a UE moves, if the UE is receiving a multicast broadcast service (hereinafter referred to as MB S), a data forwarding mechanism of the MBS service is needed. The method and device for multicast transmission provided by the disclosure can realize multicast transmission handover.

Figure 1:
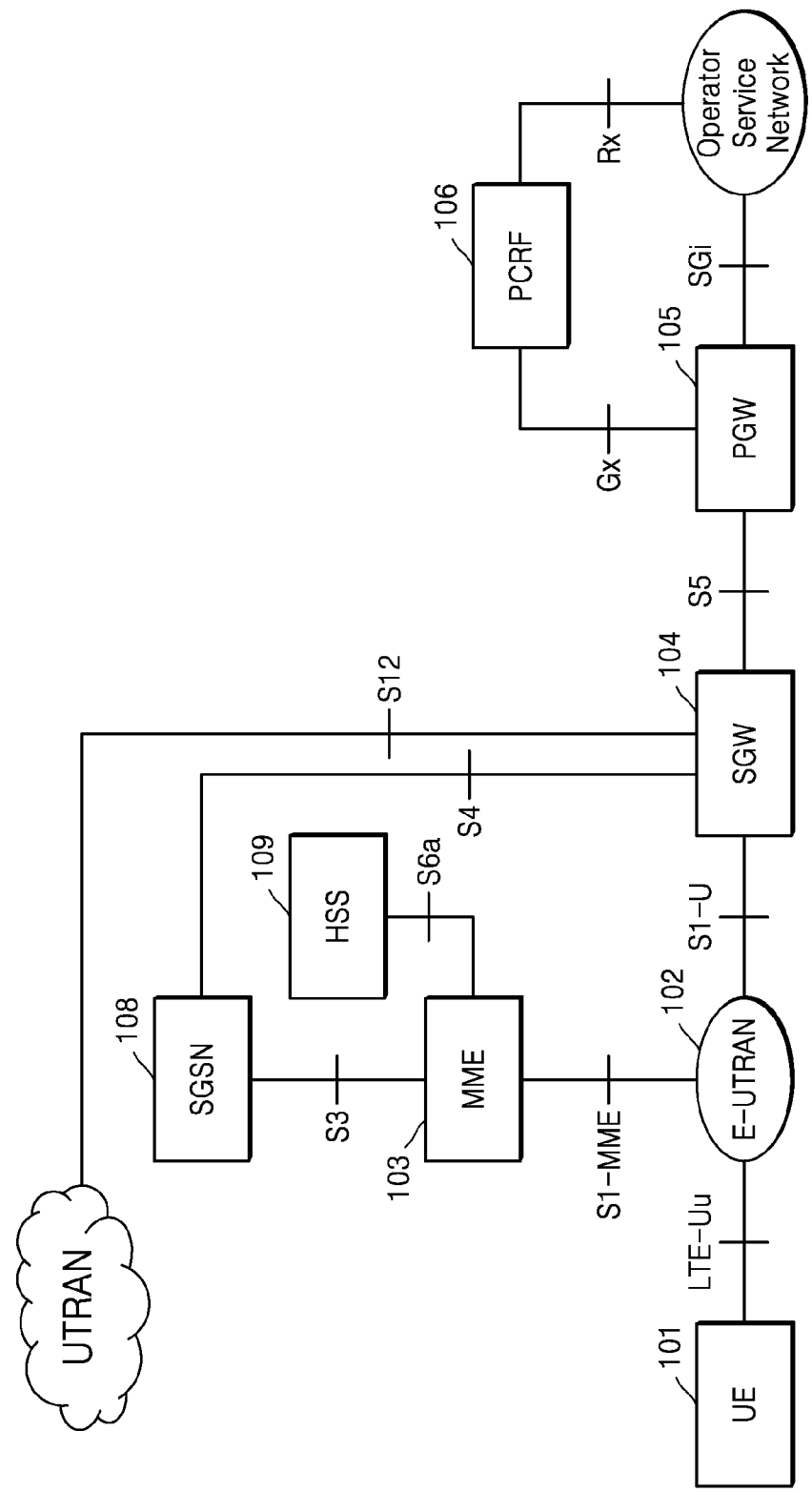
FIG. 1 illustrates a system architecture diagram of system architecture evolution (SAE)

FIG. 1 illustrates an exemplary system architecture 100 of system architecture evolution (SAE). User equipment (UE) 101 is a terminal device for receiving data. An evolved universal terrestrial radio access network (E-UTRAN) 102 is a radio access network, which includes a macro base station (eNodeB/NodeB) that provides UE with interfaces to access the radio network. A mobility management entity (MME) 103 is responsible for managing mobility context, session context and security information of the UE. A serving gateway (SGW) 104 mainly provides functions of user plane, and the MME 103 and the SGW 104 may be in the same physical entity. A packet data network gateway (PGW) 105 is responsible for functions of charging, lawful interception, etc., and may be in the same physical entity as the SGW 104. A policy and charging rules function entity (PCRF) 106 provides quality of service (QoS) policies and charging criteria. A general packet radio service support node (SGSN) 108 is a network node device that provides routing for data transmission in a universal mobile telecommunications system (UMTS). A home subscriber server (HSS)109 is a home subsystem of the UE, and is responsible for protecting user information including a current location of the user equipment, an address of a serving node, user security information, and packet data context of the user equipment, etc.

Figure 2:
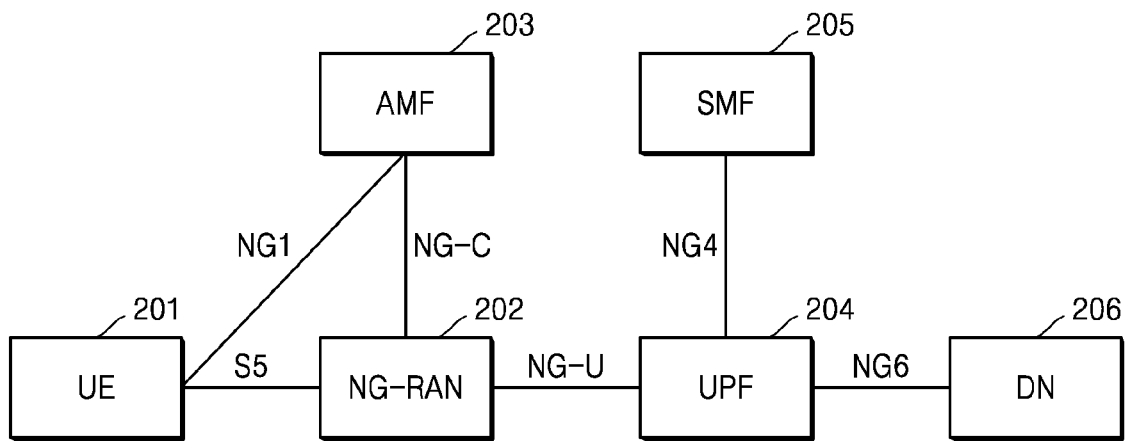
FIG. 2 illustrates a schematic diagram of the initial overall architecture of 5G.

FIG. 2 illustrates an exemplary system architecture 200 according to various embodiments of the present disclosure. Other embodiments of the system architecture 200 can be used without departing from the scope of the present disclosure.

A user equipment (UE) 201 is a terminal device for receiving data. A next generation radio access network (NG-RAN) 202 is a radio access network, which includes a base station (a gNB or an eNB connected to 5G core network 5GC, and the eNB connected to the 5GC is also called ng-gNB) that provides the UE with interfaces to access the radio network. An access control and mobility management function entity (AMF) 203 is responsible for managing mobility context and security information of the UE. A user plane function entity (UPF) 204 mainly provides functions of user plane. A session management function entity SMF 205 is responsible for session management. A data network (DN) 206 includes, for example, services of operators, access of Internet and service of third parties.

In the following embodiments, description is made by taking a 5G system as an example, taking CU-CP (centralized unit-control plane) as an example of the access network control plane, taking CU-UP (centralized unit-user plane) as an example of the access network user plane, and taking DU (distributed unit) as an example of the distributed unit. The method is also applicable to the corresponding entities of other systems.

When the UE moves, if the UE is receiving a multicast broadcast service (hereinafter referred to as MBS), a source base station may send the buffered data to a destination base station to reduce the loss of data. Compared with the data forwarding of ordinary services, the data forwarding of MBS services requires a different mechanism.

The disclosure provides a method and device for switching reception of the multicast transmission.

The method and device for multicast transmission provided by the disclosure can ensure service continuity, avoid or reduce the extra overhead of the multicast data transmission, improve the utilization efficiency of the access network resources and/or air interface resources, and reduce the transmission delay, the loss of data, the delay caused by switching, and unnecessary data transmission when the multicast transmission is switched.

Figure 3:
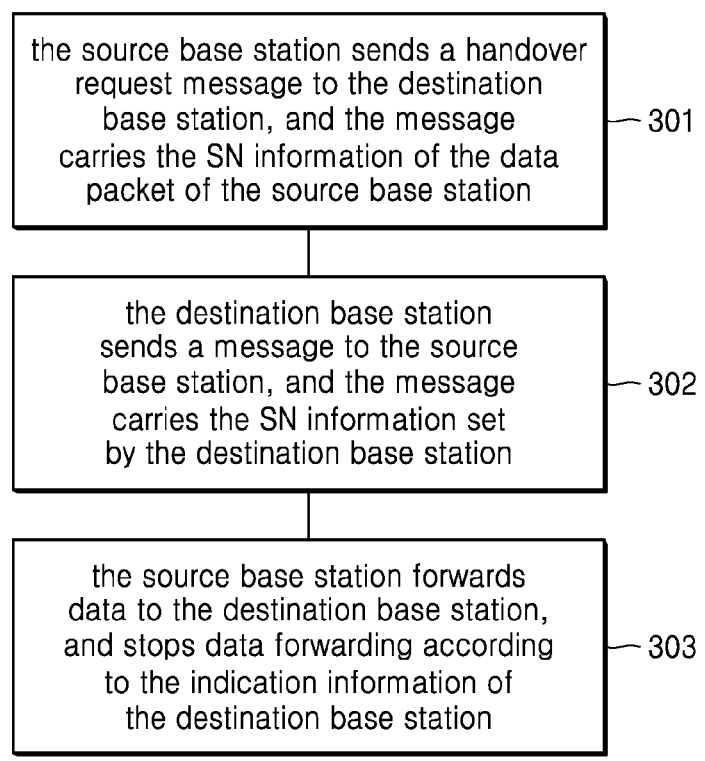
FIG. 3 illustrates a schematic diagram of Method 1 according to various embodiments of the present disclosure.

FIG. 3 illustrates a schematic diagram of Method 1 according to various embodiments of the present disclosure.

At step 301, the source base station sends a handover request to the destination base station, where the message carries an MBS service identifier that the UE is receiving or interested in, an identifier of a radio bearer of the MBS service, and/or a forwarding proposal for the MBS service, and the message may also contain sequence number (SN) information contained in an MBS data packet of the source base station.

At step 302, the destination base station decides whether the data forwarding of the MBS is needed. If the data forwarding is needed, in a handover confirmation message sent by the destination base station to the source base station, an indication of accepting the forwarding is carried, and/or SN information corresponding to the data that the destination base station has sent and/or is sending is carried, or SN corresponding to the forwarded data packet proposed by the destination base station is carried.

In another implementation, the destination base station can send a separate message to the source base station to carry the SN information corresponding to the data that the destination base station has sent and/or is sending, or to carry the SN information corresponding to the forwarded data proposed by the destination base station.

At step 303, the source base station decides when to stop data forwarding according to the SN contained in the received MB S data packet currently sent (already sent and/or being sent) by the destination base station.

According to the method of the disclosure, when the multicast transmission is switched, it is possible to ensure service continuity, avoid or reduce the extra overhead of the multicast data transmission, improve the utilization efficiency of the access network resources and/or air interface resources, and reduce the transmission delay, the loss of data, the delay caused by switching, and unnecessary data transmission.

Figure 4:
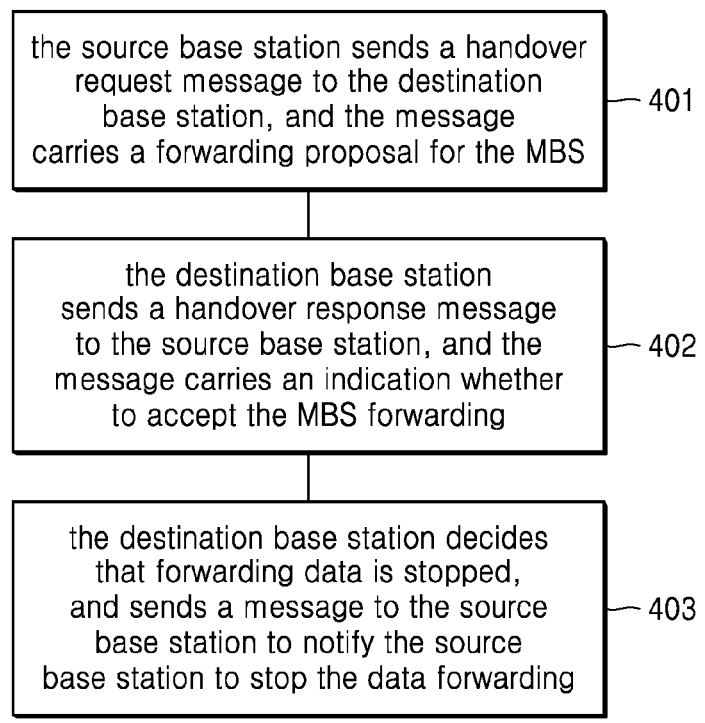
FIG. 4 illustrates a schematic diagram of Method 2 according to various embodiments of the present disclosure.

FIG. 4 illustrates a schematic diagram of Method 2 according to various embodiments of the present disclosure.

At step 401, the source base station sends a handover request to the destination base station, where the message carries an MBS service identifier that the UE is receiving or interested in, an identifier of a radio bearer of the MBS service, and/or a forwarding proposal for the MBS service.

At step 402, the destination base station decides whether the data forwarding of the MBS is needed. If the data forwarding is needed, in a handover confirmation message sent by the destination base station to the source base station, an indication of accepting the forwarding is carried.

At step 403, when the destination base station decides that the forwarding needs to be stopped, the destination base station sends a message to notify the source base station that the data forwarding is stopped. Or, when the destination base station decides that the forwarding needs to be stopped, the destination base station discards the forwarded data packet and starts sending the data packet coming from the core network, and the source base station decides by itself when to stop data sending.

In Method 1 and Method 2, the SN can be a GTP-u SN or a PDCP SN, and the PDCP SN and the GTP-U SN have a corresponding relationship, or being one-to-one correspondence, or mapping the GTP-U SN to the PDCP SN according to a predetermined rule.

According to the method of the disclosure, when the multicast transmission is switched, it is possible to ensure service continuity, avoid or reduce the extra overhead of the multicast data transmission, improve the utilization efficiency of the access network resources and/or air interface resources, and reduce the transmission delay, the loss of data, the delay caused by switching, and unnecessary data transmission.

Figure 5:
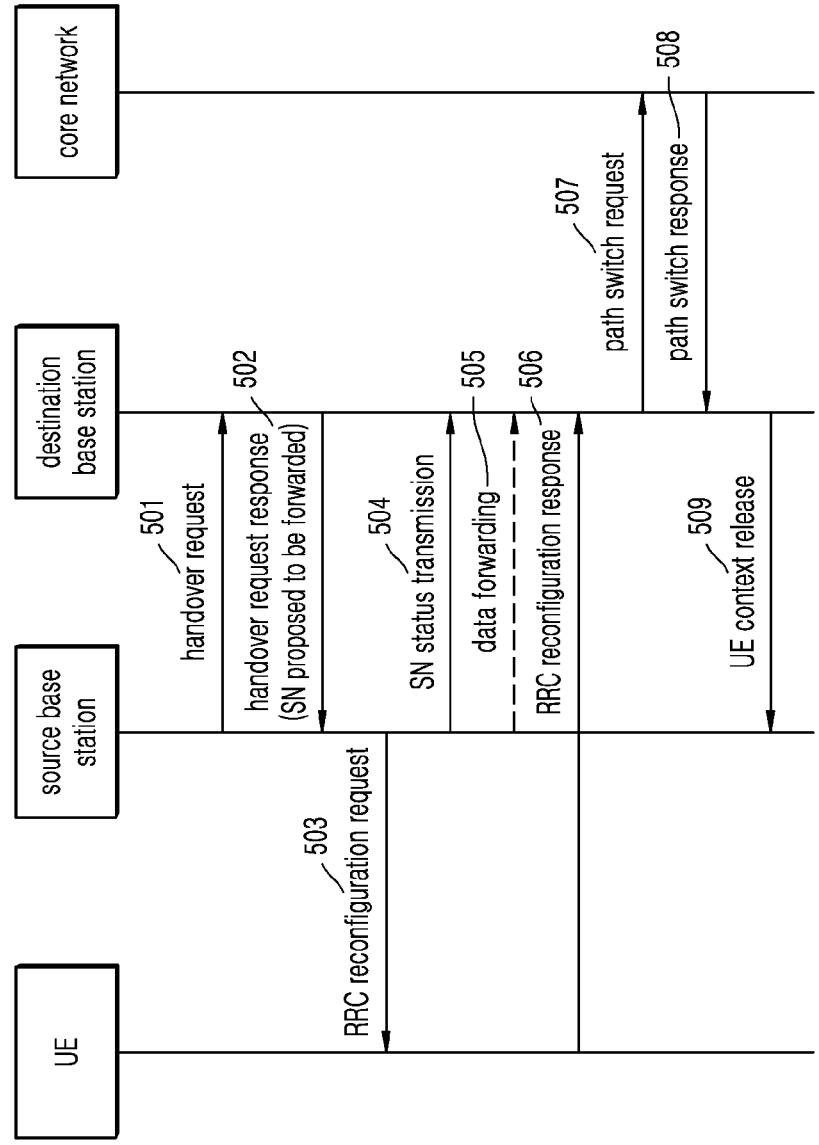
FIG. 5 illustrates a schematic diagram of Embodiment 1 according to various embodiments of the present disclosure.

FIG. 5 illustrates a schematic diagram of Embodiment 1 according to various embodiments of the present disclosure.

When the UE is handed over, FIG. 5 describes an embodiment of Method 1 on how to maintain service continuity, as shown in FIG. 5 (Embodiment 1). When the UE moves from the source base station to the destination base station, if the UE is receiving an MBS at the source base station, the UE also needs to continue receiving the MBS when the UE moves to the destination base station. In the procedure of handover, it is better that there is no loss of the MBS data, so that the UE can receive data continuously. For a unicast service, when the UE moves to the destination base station, the core network may stop sending data to the source base station and notify the source base station that the data sending is suspended, and a certain data packet is identified as the last data packet, indicating that the data sending is stopped. However, for an MBS service, the destination base station may have already sent data in the point-to-multipoint transmission mode, and the source base station also needs to continue transmission of the MBS, and may not end data transmission just because a UE moves away.

Therefore, the source base station needs to continue receiving data from the core network, and it is impossible to get the indication that the data is stopped from the core network, so the source base station does not know when it is needed to end the data forwarding. According to this embodiment, when the source base station receives the SN information sent by the destination base station, the source base station can forward the data packets that have not been sent by the destination base station to the destination base station according to the SN information, and decide when to end the data forwarding, which can reduce the data forwarding and ensure the continuous sending and reception of the data. Embodiment 1 describes the procedure, and detailed description of steps unrelated to the present disclosure is omitted here. Embodiment 1 contains the following steps.

At step 501, a source base station initiates a handover request message to a destination base station.

The message carries the session identifier of each PDU session requested, information of the QoS flow contained in the PDU session, DRB information, etc. If the UE is receiving an MBS, the message also contains the identifier of the MBS, a forwarding proposal for the MBS service, or a forwarding proposal set for a radio bearer of each MBS, and the message also contains the session identifier corresponding to the MBS, the information of the QoS flow corresponding to the MBS, the configuration information of the DRB transmitting the MBS, etc., and the mapping configuration information of the QoS flow to the MRB of the MBS at the source base station. The message may also contain the SN information of the MBS data sent by the source base station, and the SN information may contain SN of PDCP and/or SN of GTP-U.

In one embodiment, the SN information may include PDCP SN. Specifically, the PDCP SN can be one or several of the following information:

the PDCP SN list corresponding to downlink PDCP data packets that have been sent to the lower RLC layer;

the highest PDCP SN corresponding to downlink PDCP data packets that have been sent to the lower RLC layer;

the PDCP SN list corresponding to downlink PDCP data packets that have been successfully sent to the UE in sequence;

the highest PDCP SN corresponding to downlink PDCP data packets that have been successfully sent to the UE in sequence;

the PDCP SN list corresponding to downlink PDCP data packets that have been successfully sent to the UE; and/or the highest PDCP SN corresponding to downlink PDCP data packets that have been successfully sent to the UE.

In one embodiment, the SN information may include GTP-U SN. Specifically, the GTP-U SN can be one or several of the following information:

the highest SN of GTP-u data packet corresponding to data packets sent to the PDCP layer;

the highest SN of GTP-u data packet corresponding to data packets sent to the SDAP layer;

the corresponding SN with the highest sequence number in the received GTP-u data packets; the SN list of GTP-U data packets corresponding to downlink PDCP data packets that have been sent to the lower RLC layer;

the SN in the header of the GTP-U data packet with the highest sequence number corresponding to downlink PDCP data packets that have been sent to the lower RLC layer;

the SNs in the headers of GTP-U data packets corresponding to downlink PDCP data packets that have been successfully sent to the UE in sequence;

the SN in the header of the GTP-U data packet with the highest sequence number corresponding to downlink PDCP data packets successfully sent to the UE in sequence;

the SNs in the headers of GTP-U data packets corresponding to downlink PDCP data packets successfully sent to the UE; and/or the SN in the header of the GTP-U data packet with the highest sequence number corresponding to downlink PDCP data packets successfully sent to the UE.

According to whether the destination cell is already transmitting the MBS, the destination base station decides whether to send a message to the core network to request transmission of the MBS data. If the destination cell has received the MBS from the core network, the destination base station sends a response message to the source base station.

If the destination cell on the destination base station has not received the MBS data from the core network, the destination base station sends a message to the core network to request the core network to send the MBS data. The procedure of establishing an MBS bearer is described in other embodiments. The destination base station sends the response message to the source base station.

At step 502, the destination base station sends a handover request response message. The message includes a transparent transmitter from destination to source. The transparent transmitter from destination to source contains the RRC message sent by the destination base station to the UE.

The message also contains the information of the PDU session established successfully. The information of the PDU session contains the identifier of the PDU session, the identifier of the DRB established successfully, the identifier of the MBS established successfully, and the identifier of the MRB established successfully. If the destination base station is transmitting the MBS services in point-to-point transmission or point-to-multipoint transmission, the message also contains indication information that the destination base station decides that the MBS data forwarding is needed, PDCP SN information and/or SN of GTP-U corresponding to forwarded data proposed by the destination base station. The destination base station can decide whether the data forwarding is needed with reference to multiple pieces of information. For example, with reference to the SN information of the MBS data sent by the source base station received at step 501, the destination base station can decide whether the data forwarding is needed. For example, the SN of the MBS data sent by the source base station indicates that the highest GTP-u SN being sent is 80, and GTP-u SN being currently sent by the destination base station is 100, so the destination base station decides that the data forwarding is needed.

According to whether the mapping of the QoS flow to the MRB (or the DRB) of the MBS service decided by the destination base station is the same as the mapping of the QoS flow to the MRB (or the DRB) of the source base station, the destination base station can send different sequence numbers. For example, if the mapping of the QoS flow to the MRB (or the DRB) of the MBS service decided by the destination base station is the same as the mapping of the QoS flow to the MRB (or the DRB) of the source base station, and the contents of data packets corresponding to the same PDCP SN of the destination base station and the source base station are the same, the SN of the PDCP can be sent to the source base station. If the mapping configuration is different, and the contents of data packets corresponding to the same PDCP SN of the destination base station and the source base station are different, the SN of the GTP-u can be sent. In the implementation, for the sake of simplicity, a point-to-multipoint radio data bearer MRB can also be established for an MBS service, so that the mappings of the source base station and the destination base station are the same.

In one example, specifically, the SN information of PDCP and/or the SN information of GTP-U may be one or several of the following information:
  the PDCP SN list corresponding to downlink PDCP data packets that have been sent to the lower RLC layer;
  the highest PDCP SN corresponding to downlink PDCP data packets that have been sent to the lower RLC layer;
  the PDCP SN list corresponding to downlink PDCP data packets that have been successfully sent to the UE in sequence;
  the highest PDCP SN corresponding to downlink PDCP data packets that have been successfully sent to the UE in sequence;
  the PDCP SN list corresponding to downlink PDCP data packets that have been successfully sent to the UE;
  the highest PDCP SN corresponding to downlink PDCP data packets that have been successfully sent to the UE;
  the PDCP SN set by the base station, which indicates the highest PDCP SN corresponding to the downlink PDCP data packets needed to be forwarded; and/or
  the PDCP SN list set by the base station, which indicates the PDCP SN list corresponding to the downlink PDCP data packets needed to be forwarded, and may also indicate a range of SNs, for example, indicate the lowest and highest PDCP SNs.

In one example, GTP-U SN, specifically, can be one or several of the following information:
  the highest SN of GTP-u data packet corresponding to data packets sent to the PDCP layer;
  the highest SN of GTP-u data packet corresponding to data packets sent to the SDAP layer;
  the SN with the highest sequence number in the received GTP-u data packets; the SN list of GTP-U data packets corresponding to downlink PDCP data packets that have been sent to the lower RLC layer;
  the SN in the header of the GTP-U data packet with the highest sequence number corresponding to downlink PDCP data packets that have been sent to the lower RLC layer;
  the SNs in the headers of GTP-U data packets corresponding to downlink PDCP data packets that have been successfully sent to the UE in sequence;
  the SN in the header of the GTP-U data packet with the highest sequence number corresponding to downlink PDCP data packets successfully sent to the UE in sequence;
  the SNs in the headers of GTP-U data packets corresponding to downlink PDCP data packets successfully sent to the UE;
  the SN in the header of the GTP-U data packet with the highest sequence number corresponding to downlink PDCP data packets successfully sent to the UE;
  the GTP-U SN set by the base station, which indicates the highest GTP-U SN corresponding to the downlink data packets needed to be forwarded; and/or
  the GTP-U SN list set by the base station, which indicates the GTP-U list corresponding to the downlink data packets needed to be forwarded, and may also indicate a range of SNs, for example, indicate the lowest and highest GTP-U SNs.

At step 503, the source base station sends a handover execution command to the UE through a RRC reconfiguration message.

The message carries the information of the configuration of the PDU session that needs UE to establish at the destination base station. The message can also contain the MBS service identifier and channel mode indication information of the MBS received at the destination base station, and can also contain the point-to-point channel configuration information and/or point-to-multipoint channel configuration information of the MBS.

At step 504, the source base station sends the SN status transmission to the destination base station.

If the information of the PDCP SN corresponding to the MBS data received by the UE at the source base station is not contained in step 501, the PDCP SN and/or the SN of GTP-U corresponding to the MBS data can be sent through a separate message by step 503:

In one example, PDCP SN, specifically, can be one or several of the following information:
- the PDCP SN list corresponding to downlink PDCP data packets that have been sent to the lower RLC layer;
- the highest PDCP SN corresponding to downlink PDCP data packets that have been sent to the lower RLC layer;
- the PDCP SN list corresponding to downlink PDCP data packets that have been successfully sent to the UE in sequence;
- the highest PDCP SN corresponding to downlink PDCP data packets that have been successfully sent to the UE in sequence;
- the PDCP SN list corresponding to downlink PDCP data packets that have been successfully sent to the UE; and/or
- the highest PDCP SN corresponding to downlink PDCP data packets that have been successfully sent to the UE.

In one example, GTP-U SN, specifically, can be one or several of the following information:
- the highest SN of GTP-u data packet corresponding to data packets sent to the PDCP layer;
- the highest SN of GTP-u data packet corresponding to data packets sent to the SDAP layer;
- the corresponding SN with the highest sequence number in the received GTP-u data packets; the SN list of GTP-U data packets corresponding to downlink PDCP data packets that have been sent to the lower RLC layer;
- the SN in the header of the GTP-U data packet with the highest sequence number corresponding to downlink PDCP data packets that have been sent to the lower RLC layer;
- the SNs in the headers of GTP-U data packets corresponding to downlink PDCP data packets that have been successfully sent to the UE in sequence;
- the SN in the header of the GTP-U data packet with the highest sequence number corresponding to downlink PDCP data packets successfully sent to the UE in sequence;
- the SNs in the headers of GTP-U data packets corresponding to downlink PDCP data packets successfully sent to the UE; and/or
- the SN in the header of the GTP-U data packet with the highest sequence number corresponding to downlink PDCP data packets successfully sent to the UE.

At step 505, the source base station forwards the MBS data to the destination base station. According to the received SN information corresponding to the forwarded data proposed by the destination base station (SN information can be PDCP SN or GTP-u SN, as described above), the source base station decides which data need to be forwarded and when to end forwarding. For example, the destination base station proposes that the highest GTP-u SN of the forwarded data is set to 100, and the source base station is currently sending the data packet 80, so the source base station forwards data packets from 80 to 100 to the destination base station. In order to ensure the continuous reception of data, the destination base station can temporarily establish a point-to-point transmission mode for the UE and send the forwarded data to the UE through the point-to-point channel. After that, the UE can switch to the point-to-multipoint mode to receive data. When the data forwarding ends, the source base station can indicate the end of the data forwarding on the user plane, or indicate that the forwarded data packet is the last data packet.

At step 506, the UE sends an RRC reconfiguration complete message to the destination base station to indicate that the handover is completed.

At step 507, the destination base station sends a path switch request message to the core network.

When the UE is the first user that needs to receive the MBS of the destination base station and the destination base station has not received the MBS data from the core network, the destination base station can request for the transmission of the MBS data through the message of step 507. The message of step 507 carries the information of the MBS, such as the identifier of the MBS, and requests the core network to send the MBS data to the base station. In response to receiving the message of step 507, the core network starts sending a service start message of the MBS to the base station, and the base station sends a response message to the core network, after which the core network can start sending the MBS data to the base station. The destination base station first sends the forwarded data received from the source base station, and then sends the new data received from the core network.

At step 508, the core network sends a path switch response message to the destination base station.

At step 509, the destination base station sends a UE context release message to the source base station to release the context information of the UE on the source base station.

Embodiment 1 can be used for the source base station to send the MBS data by using the point-to-point channel or point-to-multipoint channel and for the destination base station to send the MBS data by using the point-to-multipoint channel. It can also be applied to other situations.

According to the method of the disclosure, when the multicast transmission is switched, it is possible to ensure service continuity, avoid or reduce the extra overhead of the multicast data transmission, improve the utilization efficiency of the access network resources and/or air interface resources, and reduce the transmission delay, the loss of data, the delay caused by switching, and unnecessary data transmission.

Figure 6:
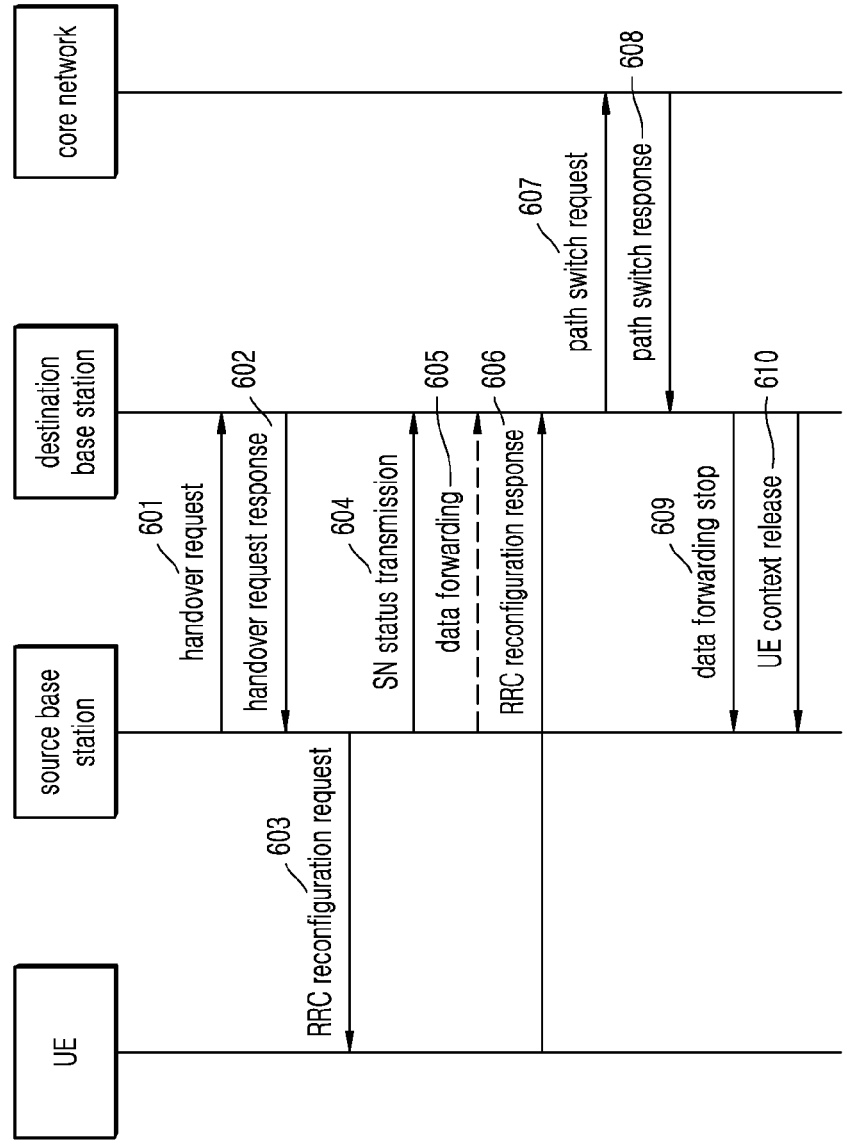
FIG. 6 illustrates a schematic diagram of Embodiment 2 according to various embodiments of the present disclosure.

FIG. 6 illustrates a schematic diagram of Embodiment 2 according to various embodiments of the present disclosure.

When the UE is handed over, FIG. 6 describes an embodiment of Method 1 on how to maintain service continuity, as shown in FIG. 6 (Embodiment 2). When the UE moves from the source base station to the destination base station, if the UE is receiving an MBS at the source base station, when the UE moves to the destination base station, the UE also needs to continue receiving the MBS. In the procedure of handover, it is better that there is no loss of the MBS data, so that the UE can receive data continuously. Generally speaking, in the present disclosure, the destination base station sends an indication that forwarding is stopped to the source base station, and the source base station stops the data forwarding. Or the destination base station decides which data to discard according to the SN corresponding to the forwarded data packet, and the source base station decides by itself when to stop the data forwarding according to the implementation, for example, by using a manner of clock. This can reduce the data forwarding and ensure the continuous sending and reception of the data. Embodiment 2 describes the procedure, and detailed description of steps unrelated to the present disclosure is omitted here. It contains the following steps.

At step 601, a source base station initiates a handover request message to a destination base station.

The message carries the session identifier of each PDU session requested, information of the QoS flow contained in the PDU session, DRB information, etc. If the UE is receiving an MBS, the message also contains the identifier of the MBS, a forwarding proposal for an MBS service, or a forwarding proposal set for a radio bearer of each MBS, the message also contains the session identifier corresponding to the MBS, the information of the QoS flow corresponding to the MBS, the configuration information of the DRB transmitting the MBS, etc. and the mapping configuration information of the QoS flow to the MRB of the MBS at the source base station. The message may also contain the SN information of the MBS data sent by the source base station, and the SN information may contain SN of PDCP and/or SN of GTP-U. For specific information, see the description of Embodiment 1 above.

According to whether the destination cell is already transmitting the MBS, the destination base station decides whether to send a message to the core network to request the transmission of the MBS data. If the destination cell has received the MBS from the core network, the destination base station sends a response message to the source base station.

If the destination cell on the destination base station has not received the MBS data from the core network, the destination base station sends a message to the core network to request the core network to send the MBS data. The procedure of establishing an MBS bearer has already been described in other embodiments, and repeated description is omitted here. The destination base station sends the response message to the source base station.

At step 602, the destination base station sends a handover request response message. The message includes a transparent transmitter from destination to source. The transparent transmitter from destination to source contains the RRC message sent by the destination base station to the UE.

The message also contains the information of the PDU session established successfully. The information of the PDU session contains the identifier of the PDU session, the identifier of the DRB established successfully, the identifier of the MBS established successfully, and the identifier of the MRB established successfully. The message also contains indication information that the destination base station decides that the MBS data forwarding is needed.

At step 603, the source base station sends a handover execution command to the UE through a RRC reconfiguration message.

The message carries the information of the configuration of the PDU session that needs UE to establish at the destination base station. The message can also contain the MBS service identifier and channel mode indication information of the MBS received at the destination base station, and can also contain the point-to-point channel configuration information and/or point-to-multipoint channel configuration information of the MBS.

At step 604, the source base station sends the SN status transmission to the destination base station.

If the information of the PDCP SN corresponding to the MBS data received by the UE at the source base station is not contained in step 601, the PDCP SN and/or the SN of GTP-U corresponding to the MBS data can be sent through a separate message by step 604. For specific information, see the description of Embodiment 1 above. This step can also be omitted as required.

At step 605, the source base station forwards the MBS data to the destination base station. In order to send the forwarded data to the UE, the destination base station can establish a point-to-point transmission mode for the UE and send the forwarded data to the UE through the point-to-point channel. Then, after all the forwarded data are sent to the UE, according to the further decision of the destination base station, the UE can switch to point-to-multipoint or continue to receive the MBS data by using the point-to-point channel. When the data forwarding ends, the source base station can indicate the end of the data forwarding on the user plane, or indicate that the forwarded data packet is the last data packet.

At step 606, the UE sends an RRC reconfiguration complete message to the destination base station to indicate that the handover is completed.

At step 607, the destination base station sends a path switch request message to the core network.

When the UE is the first user that needs to receive the MBS of the destination base station and the destination base station has not received the MBS data from the core network, the destination base station can request the transmission of the MBS data through the message of step 607. The message of step 607 carries the information of the MBS, such as the identifier of the MBS, and requests the core network to send the MBS data to the base station. In response to receiving the message of step 607, the core network starts sending a service start message of the MBS to the base station, and the base station sends a response message to the core network, after which the core network can start sending the MBS data to the base station. The destination base station first sends the forwarded data received from the source base station, and then sends the new data received from the core network.

At step 608, the core network sends a path switch response message to the destination base station.

At step 609, the destination base station sends a message that data forwarding is stopped to the source base station.

After step 607, the core network starts sending data to the destination base station. After receiving the data sent by the core network, the destination base station can get the GTP-U SN contained in the header of the data packet, and decide when the destination base station is unnecessary to forward according to the SN contained in the header of the forwarded data packet as well as the GTP-U SN sent by the core network. Or, upon receiving the handover request message from the UE, the destination base station has received the MBS data packet sent by the core network, and the destination base station can decide whether to stop the data forwarding according to the SN contained in the header of the forwarded data packet as well as the GTP-U SN received from the core network. When the destination base station decides that the forwarding needs to be stopped, the destination base station sends a message to notify the source base station that the data forwarding is stopped, and then the source base station stops forwarding data to the destination base station. Or the destination base station sends the indication information that the data forwarding is stopped to the source base station through the user plane.

Or, according to the SN contained in the header of the forwarded data packet as well as the GTP-U SN received from the core network, the destination base station decides which forwarded data packets to be discarded and starts sending data packets coming from the core network. According to the implementation method adopted by the source base station, when to stop data forwarding is decided, for example, based on a predetermined data forwarding clock, when the forwarding clock times out, the source base station stops forwarding data.

At step 610, the destination base station sends a UE context release message to the source base station to release the context information of the UE on the source base station. Steps 609 and 610 can also be sent by combining into the same message.

Embodiment 2 can be used for the source base station to send the MBS data by using the point-to-point channel or point-to-multipoint channel and for the destination base station to send the MBS data by using the point-to-multipoint channel. It can also be applied to other situations.

According to the method of the disclosure, when the multicast transmission is switched, it is possible to ensure service continuity, avoid or reduce the extra overhead of the multicast data transmission, improve the utilization efficiency of the access network resources and/or air interface resources, and reduce the transmission delay, the loss of data, the delay caused by switching, and unnecessary data transmission.

Figure 7:
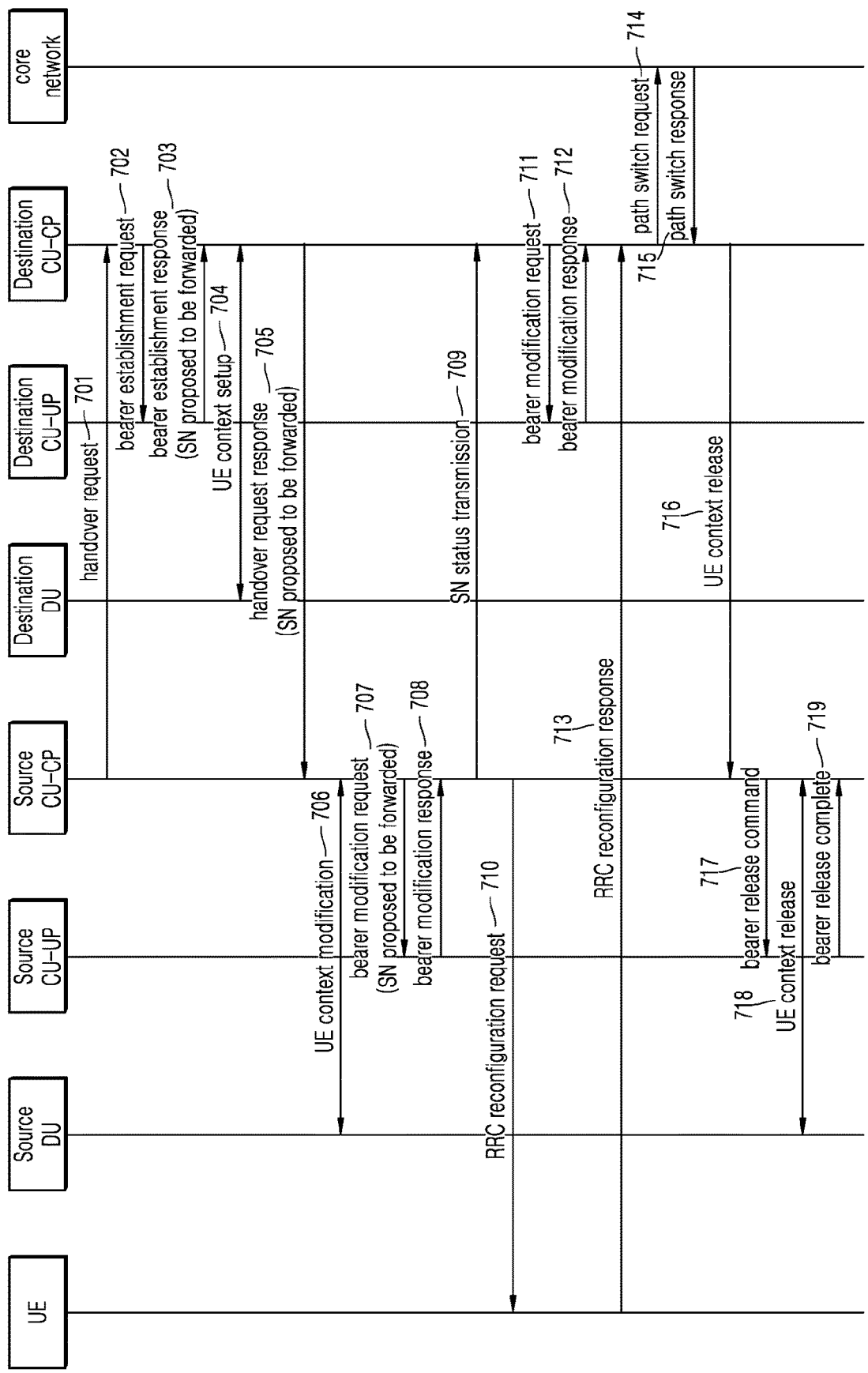
FIG. 7 illustrates a schematic diagram of Embodiment 3 according to various embodiments of the present disclosure.

FIG. 7 illustrates a schematic diagram of Embodiment 3 according to various embodiments of the present disclosure.

The present disclosure also includes an embodiment of Method 2 on how to maintain service continuity when the UE is handed over, as shown in FIG. 7 (Embodiment 3). When the UE moves from the source base station to the destination base station, if the UE is receiving an MBS at the source base station, the UE also needs to continue receiving the MBS when the UE moves to the destination base station. In the handover procedure, it is better that there is no loss of the MBS data, so that the UE can receive data continuously. Generally speaking, the present disclosure adopts step 1: the source base station notifies the destination base station of the serial number SN corresponding to the packet sent by the source base station, and the destination base station can decide whether the destination base station is needed to perform data forwarding based on this; step 2: the destination base station notifies the source base station of accepting the forwarding and carries the SN information corresponding to data that have been sent or are being sent by the destination base station, or carries the SN information corresponding to the forwarded data proposed by the destination base station, and based on this, the source base station can decide which data need to be forwarded or when the data forwarding ends.

For a unicast service, when the UE moves to the destination base station, the core network may stop sending data to the source base station and notify the source base station that the data sending is suspended, and a certain data packet is identified as the last data packet, indicating that the data sending is stopped. However, for an MBS service, the destination base station may have already sent data in the point-to-multipoint transmission mode, and the source base station also needs to continue transmission of the MBS, and may not end data transmission just because a UE moves away. Therefore, the source base station continues receiving data from the core network, and it is impossible to get the indication that the data is stopped from the core network, so the source base station does not know when the source base station is needed to end the data forwarding. According to this embodiment, when the source base station receives the SN information sent by the destination base station, the source base station can forward the data packets that have not been sent by the destination base station to the destination base station according to the indication, and decide when to end the data forwarding, which can reduce the data forwarding and ensure the continuous sending and reception of the data. Embodiment 3 describes that the procedure is applied to a separate architecture, and detailed description of steps unrelated to the present disclosure is omitted here. Embodiment 3 contains the following steps.

At step 701, a source base station CU-CP initiates a handover request message to a destination base station CU-CP.

The message carries the session identifier of each PDU session requested, information of the QoS flow contained in the PDU session, DRB information, etc. If the UE is receiving an MBS, the message also contains the identifier of the MBS, a forwarding proposal for an MBS service, or a forwarding proposal set for a radio bearer of each MBS, the message also contains the session identifier corresponding to the MBS, the information of the QoS flow corresponding to the MBS, the mapping of the QoS flow to the MRB and/or the QoS flow to the DRB, the configuration information of the MRB transmitting the MBS and/or the DRB transmitting the MBS, etc.

According to whether the destination cell is already transmitting the MBS, the destination base station decides whether to send a message to the core network to request the transmission of the MBS data. If the destination cell has received the MBS from the core network, the destination base station sends a response message to the source base station.

If the destination cell on the destination base station has not received the MBS data from the core network, the destination base station sends a message to the core network to request the core network to send the MBS data. The procedure of establishing an MBS bearer is described in other embodiments. The destination base station sends the response message to the source base station.

At step 702, the destination CU-CP initiates a bearer establishment request message to the destination CU-UP. According to whether the mapping of the QoS flow to the MRB (or the DRB) of the MBS service decided by the destination CU-CP is the same as the mapping of the QoS flow to the MRB (or the DRB) of the source base station, the destination CU-CP can indicate which serial number the CU-UP sends to the destination CU-CP in the message. For example, if the mapping configuration is the same and the contents of data packets corresponding to the same PDCP SN of the destination base station and the source base station are the same, the CU-CP instructs the CU-UP to send the SN of PDCP to the CU-CP. And, if the mapping configurations are different, the CU-CP instructs the CU-UP to send the SN of GTP-u to the CU-CP.

The message also contains the identifier of the MBS, a forwarding proposal for an MBS service, or a forwarding proposal set for a radio bearer of each MBS, the message also contains the session identifier corresponding to the MBS, the information of the QoS flow corresponding to the MBS, the configuration information of the DRB transmitting the MBS, etc., and the message can also contain the mapping configuration information of the QoS flow to the MRB of the MBS at the source base station. According to whether the mapping of the QoS flow to the MRB (or the DRB) of the MBS service decided by the destination CU-CP is the same as the mapping of the QoS flow to the MRB (or the DRB) of the source base station, the destination CU-UP can decide which serial number to send to the destination CU-CP.

At step 703, the destination CU-UP initiates a bearer establishment response message to the destination CU-CP.

The message carries the information of the PDU session established successfully, the identifier of the DRB established successfully, the identifier of the MBS established successfully, and the identifier of the MRB established successfully. The message also contains the indication information that the destination CU-UP decides that the MBS data forwarding is needed, and the information of PDCP SN or SN of GTP-U corresponding to the forwarded data proposed by the destination CU-UP. For the specific information of the SN, see the following step 705.

At step 704, a UE context is set up between the destination CU-CP and DU. This procedure is the same as the procedure described in the previous embodiments, and is omitted here.

At step 705, the destination CU-CP sends a handover request confirmation message to the source CU-CP. The message includes a transparent transmitter from destination to source. The transparent transmitter from destination to source contains the RRC message sent by the destination base station to the UE.

The message also contains the information of the PDU session established successfully. The information of the PDU session contains the identifier of the PDU session, the identifier of the DRB established successfully, the identifier of the MBS established successfully, and the identifier of the MRB established successfully. If the destination base station is transmitting the MBS services in point-to-point transmission or point-to-multipoint transmission, the message also contains indication information that the destination base station decides that the MBS data forwarding is needed, PDCP SN information and/or SN of GTP-U corresponding to forwarded data proposed by the destination base station.

Specifically, the PDCP SN information and/or the SN information of GTP-U may be one or several of the following information:
the PDCP SN list corresponding to downlink PDCP data packets that have been sent to the lower RLC layer;
the highest PDCP SN corresponding to downlink PDCP data packets that have been sent to the lower RLC layer;
the PDCP SN list corresponding to downlink PDCP data packets that have been successfully sent to the UE in sequence;
the highest PDCP SN corresponding to downlink PDCP data packets that have been successfully sent to the UE in sequence;
the PDCP SN list corresponding to downlink PDCP data packets that have been successfully sent to the UE;
the highest PDCP SN corresponding to downlink PDCP data packets that have been successfully sent to the UE;
the PDCP SN set by the base station, which indicates the highest PDCP SN corresponding to the downlink PDCP data packets needed to be forwarded; and/or
the PDCP SN list set by the base station, which indicates the PDCP SN list corresponding to the downlink PDCP data packets needed to be forwarded, and may also indicate a range of SNs, for example, indicate the lowest and highest PDCP SNs.

In one example, GTP-U SN, specifically, can be one or several of the following information:
the highest SN of GTP-u data packet corresponding to data packets sent to the PDCP layer;
the highest SN of GTP-u data packet corresponding to data packets sent to the SDAP layer;
the corresponding SN with the highest sequence number in the received GTP-u data packets; the SN list of GTP-U data packets corresponding to downlink PDCP data packets that have been sent to the lower RLC layer;
the SN in the header of the GTP-U data packet with the highest sequence number corresponding to downlink PDCP data packets that have been sent to the lower RLC layer;
the SNs in the headers of GTP-U data packets corresponding to downlink PDCP data packets that have been successfully sent to the UE in sequence;
the SN in the header of the GTP-U data packet with the highest sequence number corresponding to downlink PDCP data packets successfully sent to the UE in sequence;
the SNs in the headers of GTP-U data packets corresponding to downlink PDCP data packets successfully sent to the UE;
the SN in the header of the GTP-U data packet with the highest sequence number corresponding to downlink PDCP data packets successfully sent to the UE;
the GTP-U SN set by the base station, which indicates the highest GTP-U SN corresponding to the downlink data packets needed to be forwarded; and/or
the GTP-U SN list set by the base station, which indicates the GTP-U SN list corresponding to the downlink data packets needed to be forwarded, and may also indicate a range of SNs, for example, indicate the lowest and highest GTP-U SNs.

At step 706, a UE context modification procedure is performed between the source CU-CP and DU.

At step 707, the source CU-CP sends a bearer modification request message to the source CU-UP.

The message carries the PDCP SN information and/or the SN information of GTP-U corresponding to the forwarded data received from the destination CU-CP. For the specific information of the SN, see step 705 above.

At step 708, the source CU-UP sends a bearer modification response message to the source CU-CP.

The message carries the SN information of PDCP or the SN of GTP-U of the source base station. Specifically, it is as shown in step 705.

At step 709, the source CU-CP sends SN status transmission to the destination CU-CP.

If the PDCP SN information corresponding to the MBS data received by the UE at the source base station is not contained in step 701, the information of the PDCP SN and/or the SN information of GTP-U corresponding to the MBS data can be sent through a separate message by step 709, and for the specific information of the SN, see step 705 above.

At step 710, the source base station CU-CP sends a handover execution command to the UE through a RRC reconfiguration message.

The message carries the information of the configuration of the PDU session that needs UE to establish at the destination base station, can also contain the MBS service identifier and channel mode indication information of the MBS received at the destination base station, and can also contain the point-to-point channel configuration information and/or point-to-multipoint channel configuration information of the MBS.

At step 711, the destination CU-CP sends a bearer modification request message to the destination CU-UP. The message may also contain the information of PDCP SN or GTP-u SN received by the destination CP, for example, the information received from step 709.

At step 712, the destination CU-UP sends a bearer modification response message to the destination CU-CP.

At step 713, the UE sends an RRC reconfiguration complete message to the destination base station to indicate that the handover is completed.

At step 714, the destination CU-CP sends a path switch request message to the core network.

When the UE is the first user that needs to receive the MBS of the destination base station and the destination base station has not received the MBS data from the core network, the destination base station can request the transmission of the MBS data through the message of step 714. The message of step 714 carries the information of MBS, such as the identifier of MBS, and requests the core network to send the MBS data to the base station. In response to receiving the message of step 714, the core network starts sending a service start message of MBS to the base station, and the base station sends a response message to the core network, after which the core network can start sending the MBS data to the base station. The destination base station first sends the forwarded data received from the source base station, and then sends the new data received from the core network.

At step 715, the core network sends a path switch response message to the destination CU-CP.

At step 716, the destination CU-CP sends a UE context release message to the source CU-CP.

At step 717, the source CU-CP sends a bearer release command to the source CU-UP.

At step 718, the source CU-CP initiates a UE context release procedure between the source CU-CP and the DU.

At step 719, the source CU-UP sends a bearer release complete message to the source CU-CP.

According to the method of the disclosure, when the multicast transmission is switched, it is possible to ensure service continuity, avoid or reduce the extra overhead of the multicast data transmission, improve the utilization efficiency of the access network resources and/or air interface resources, and reduce the transmission delay, the loss of data, the delay caused by switching, and unnecessary data transmission.

Figure 8:
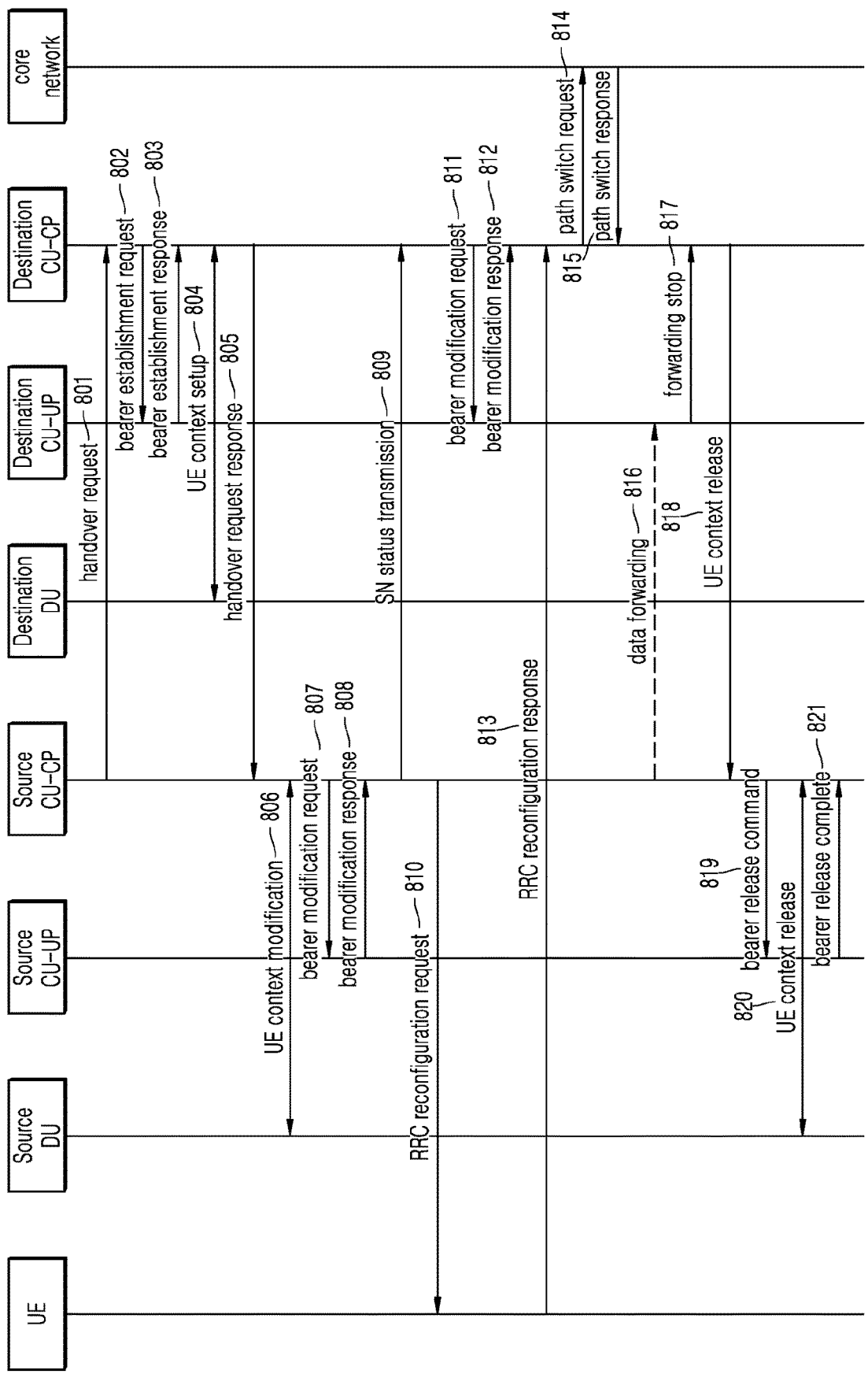
FIG. 8 illustrates a schematic diagram of Embodiment 4 according to various embodiments of the present disclosure.

FIG. 8 illustrates a schematic diagram of Embodiment 4 according to various embodiments of the present disclosure.

The present disclosure also includes another embodiment of Method 2 on how to maintain service continuity when the UE is handed over, as shown in FIG. 8 (Embodiment 4). When the UE moves from the source base station to the destination base station, if the UE is receiving an MBS at the source base station, when the UE moves to the destination base station, the UE also needs to continue receiving the MBS. In the handover procedure, it is better that there is no loss of the MBS data, so that the UE can receive data continuously. Generally speaking, in the present disclosure, the destination base station sends a forwarding stop indication to the source base station, and the source base station stops the data forwarding. Or the destination base station decides which data to discard according to the SN corresponding to the forwarded data packet, and the source base station decides by itself when to stop the data forwarding according to the implementation, for example, by using a manner of clock. This can reduce the data forwarding and ensure the continuous sending and reception of the data. Embodiment 4 describes the procedure, and detailed description of steps unrelated to the present disclosure is omitted here. Embodiment 4 contains the following steps.

At step 801, a source base station CU-CP initiates a handover request message to a destination base station CU-CP.

The message carries the session identifier of each PDU session requested, information of the QoS flow contained in the PDU session, DRB information, etc. If the UE is receiving an MBS, the message also contains the identifier of the MBS, a forwarding proposal for an MBS service, or a forwarding proposal set for a radio bearer of each MBS, the message also contains the session identifier corresponding to the MBS, the information of the QoS flow corresponding to the MBS, the mapping of the QoS flow to the MRB and/or the QoS flow to the DRB, the configuration information of the MRB transmitting the MBS and/or the DRB transmitting the MBS, etc.

According to whether the destination cell is already transmitting the MBS, the destination base station decides whether to send a message to the core network to request the transmission of the MBS data. If the destination cell has received the MBS from the core network, the destination base station sends a response message to the source base station.

If the destination cell on the destination base station has not received the MBS data from the core network, the destination base station sends a message to the core network to request the core network to send the MBS data. The procedure of establishing an MBS bearer is described in other embodiments. The destination base station sends the response message to the source base station.

At step 802, the destination CU-CP initiates a bearer establishment request message to the destination CU-UP. According to whether the mapping of the QoS flow to the MRB (or the DRB) of the MBS service decided by the destination CU-CP is the same as the mapping of the QoS flow to the MRB (or the DRB) of the source base station, the destination CU-CP can indicate which serial number the CU-UP sends to the destination CU-CP in the message. For example, if the mapping configuration is the same and the contents of data packets corresponding to the same PDCP SN of the destination base station and the source base station are the same, the CU-CP instructs the CU-UP to send the SN of PDCP to the CU-CP. And, if the mapping configurations are different, the CU-CP instructs the CU-UP to send the SN of GTP-u to the CU-CP.

The message also contains the identifier of the MBS, a forwarding proposal for an MBS service, or a forwarding proposal set for a radio bearer of each MBS, the message also contains the session identifier corresponding to the MBS, the information of the QoS flow corresponding to the MBS, the configuration information of the DRB transmitting the MBS, etc., and the message can also contain the mapping configuration information of the QoS flow to the MRB of the MBS at source base station. According to whether the mapping of the QoS flow to the MRB (or the DRB) of the MBS service decided by the destination CU-CP is the same as the mapping of the QoS flow to the MRB (or the DRB) of the source base station, the destination CU-UP can decide which serial number to send to the destination CU-CP.

At step 803, the destination CU-UP initiates a bearer establishment response message to the destination CU-CP.

The message carries the information of the PDU session established successfully, the identifier of the DRB established successfully, the identifier of the MBS established successfully, and the identifier of the MRB established successfully. The message also contains the indication information that the destination CU-UP decides that the MBS data forwarding is needed.

At step 804, a UE context is set up between the destination CU-CP and DU. This procedure is the same as the procedure described in the previous embodiments, and is omitted here.

At step 805, the destination CU-CP sends a handover request response message to the source CU-CP. The message includes a transparent transmitter from destination to source. The transparent transmitter from destination to source contains the RRC message sent by the destination base station to the UE.

The message also contains the information of the PDU session established successfully. The information of the PDU session contains the identifier of the PDU session, the identifier of the DRB established successfully, the identifier of the MBS established successfully, and the identifier of the MRB established successfully. The message also contains indication information that the destination base station decides that the MBS data forwarding is needed.

At step 806, a UE context modification procedure is performed between the source CU-CP and DU.

At step 807, the source CU-CP sends a bearer modification request message to the source CU-UP.

The message carries the identifier of MBS and the indication information needed by the forwarded data of MBS received from the destination CU-CP.

At step 808, the source CU-UP sends a bearer modification response message to the source CU-CP.

The message carries the information of the SN of the PDCP or SN of GTP-U of the source base station. Specifically, the SN information of PDCP and/or the SN information of GTP-U may be one or several of the following information:

the PDCP SN list corresponding to downlink PDCP data packets that have been sent to the lower RLC layer;

the highest PDCP SN corresponding to downlink PDCP data packets that have been sent to the lower RLC layer;

the PDCP SN list corresponding to downlink PDCP data packets that have been successfully sent to the UE in sequence;

the highest PDCP SN corresponding to downlink PDCP data packets that have been successfully sent to the UE in sequence;

the PDCP SN list corresponding to downlink PDCP data packets that have been successfully sent to the UE; and/or the highest PDCP SN corresponding to downlink PDCP data packets that have been successfully sent to the UE.

In one example, GTP-U SN, specifically, can be one or several of the following information:

the highest SN of GTP-u data packet corresponding to data packets sent to the PDCP layer;

the highest SN of GTP-u data packet corresponding to data packets sent to the SDAP layer;

the SN corresponding to the highest sequence number in the received GTP-u data packets;

the SN list of GTP-U data packets corresponding to downlink PDCP data packets that have been sent to the lower RLC layer;

the SN in the header of the GTP-U data packet with the highest sequence number corresponding to downlink PDCP data packets that have been sent to the lower RLC layer;

the SNs in the headers of GTP-U data packets corresponding to downlink PDCP data packets that have been successfully sent to the UE in sequence;

the SN in the header of the GTP-U data packet with the highest sequence number corresponding to downlink PDCP data packets successfully sent to the UE in sequence;

the SNs in the headers of GTP-U data packets corresponding to downlink PDCP data packets successfully sent to the UE; and/or the SN in the header of the GTP-U data packet with the highest sequence number corresponding to downlink PDCP data packets successfully sent to the UE.

At step 809, the source CU-CP sends SN status transmission to the destination CU-CP.

If the PDCP SN information corresponding to the MBS data received by the UE at the source base station is not contained in step 801, the information of the PDCP SN and/or the SN information of GTP-U corresponding to the MB S data can be sent through a separate message by step 809, and for the specific information of the SN, see step 808 above.

At step 810, the source base station CU-CP sends a handover execution command to the UE through a RRC reconfiguration message.

The message carries the information of the configuration of the PDU session that needs UE to establish at the destination base station, can also contain the MBS service identifier and channel mode indication information of the MBS received at the destination base station, and can also contain the point-to-point channel configuration information and/or point-to-multipoint channel configuration information of the MBS.

At step 811, the destination CU-CP sends a bearer modification request message to the destination CU-UP. The message may also contain the information of PDCP SN or GTP-u SN received by the destination CP, for example, the information received from step 809.

At step 812, the destination CU-UP sends a bearer modification response message to the destination CU-CP.

At step 813, the UE sends an RRC reconfiguration complete message to the destination base station to indicate that the handover is completed.

At step 814, the destination CU-CP sends a path switch request message to the core network.

When the UE is the first user that needs to receive the MBS of the destination base station and the destination base station has not received the MBS data from the core network, the destination base station can request the transmission of the MBS data through the message of step 814. The message of step 814 carries the information of MBS, such as the identifier of MBS, and requests the core network to send the MBS data to the base station. In response to receiving the message of step 814, the core network starts sending a service start message of MBS to the base station, and the base station sends a response message to the core network, after which the core network can start sending the MBS data to the base station. The destination base station first sends the forwarded data received from the source base station, and then sends the new data received from the core network.

At step 815, the core network sends a path switch response message to the destination CU-CP.

At step 816, the source CU-UP forwards the MBS data to the destination CU-UP. In order to send the forwarded data to the UE, the destination CU-CP can establish a point-to-point transmission mode for the UE and send the forwarded data to the UE through the point-to-point channel. Then, after all the forwarded data are sent to the UE, according to the further decision of the destination base station, the UE can switch to point-to-multipoint or continue to receive the MBS data by using the point-to-point channel. When the data forwarding ends, the source CU-CP can indicate the end of the data forwarding on the user plane, or indicate that the forwarded data packet is the last data packet.

At step 817, the destination CU-UP sends a message that data forwarding is stopped to the destination CU-CP.

After step 814, the core network starts sending data to the destination CU-UP. After receiving the data sent by the core network, the destination base station can get the GTP-U SN contained in the header of the data packet, and decide when the destination base station is unnecessary to forward according to the SN contained in the header of the forwarded data packet as well as the GTP-U SN sent by the core network. Or, upon receiving the bearer establishment message or the bearer modification request message of the CU-CP, the destination CU-UP has received the MBS data packet sent by the core network, and the destination CU-UP can decide whether to stop the data forwarding according to the SN contained in the header of the forwarded data packet as well as the GTP-U SN received from the core network. When the destination CU-UP decides that the forwarding needs to be stopped, the destination CU-UP sends a message to notify the destination CU-CP that the data forwarding is stopped, and the destination CU-CP further notifies the source CU-CP and the source CU-CP notifies the source CU-UP that data forwarding is stopped, then the source CU-UP stops forwarding data to the destination CU-UP. Or the destination CU-UP sends the indication information that the data forwarding is stopped to the source CU-UP through the user plane. The method of user plane is more direct and simple.

Or, according to the SN contained in the header of the forwarded data packet as well as the GTP-U SN received from the core network, the destination CU-UP decides which forwarded data packets to be discarded and starts sending data packets coming from the core network. According to the implementation method adopted by the source CU-UP, when to stop data forwarding is decided, for example, based on a predetermined data forwarding clock, when the forwarding clock times out, the source CU-UP stops forwarding data.

At step 818, the destination CU-CP sends a UE context release message to the source CU-CP. The message contains the indication information that the data forwarding is stopped. When the destination CU-CP knows there is MBS data forwarding, the destination CU-CP needs to wait for the destination CU-UP to notify that the data forwarding is stopped, and then send the UE context release message to the source CU-CP.

At step 819, the source CU-CP sends a bearer release command to the source CU-UP. The message contains the indication information that the data forwarding is stopped.

At step 820, the source CU-CP initiates a UE context release procedure between the source CU-CP and the DU.

At step 821, the source CU-UP sends a bearer release complete message to the source CU-CP.

According to the method of the disclosure, when the multicast transmission is switched, it is possible to ensure service continuity, avoid or reduce the extra overhead of the multicast data transmission, improve the utilization efficiency of the access network resources and/or air interface resources, and reduce the transmission delay, the loss of data, the delay caused by switching, and unnecessary data transmission.

Figure 9:
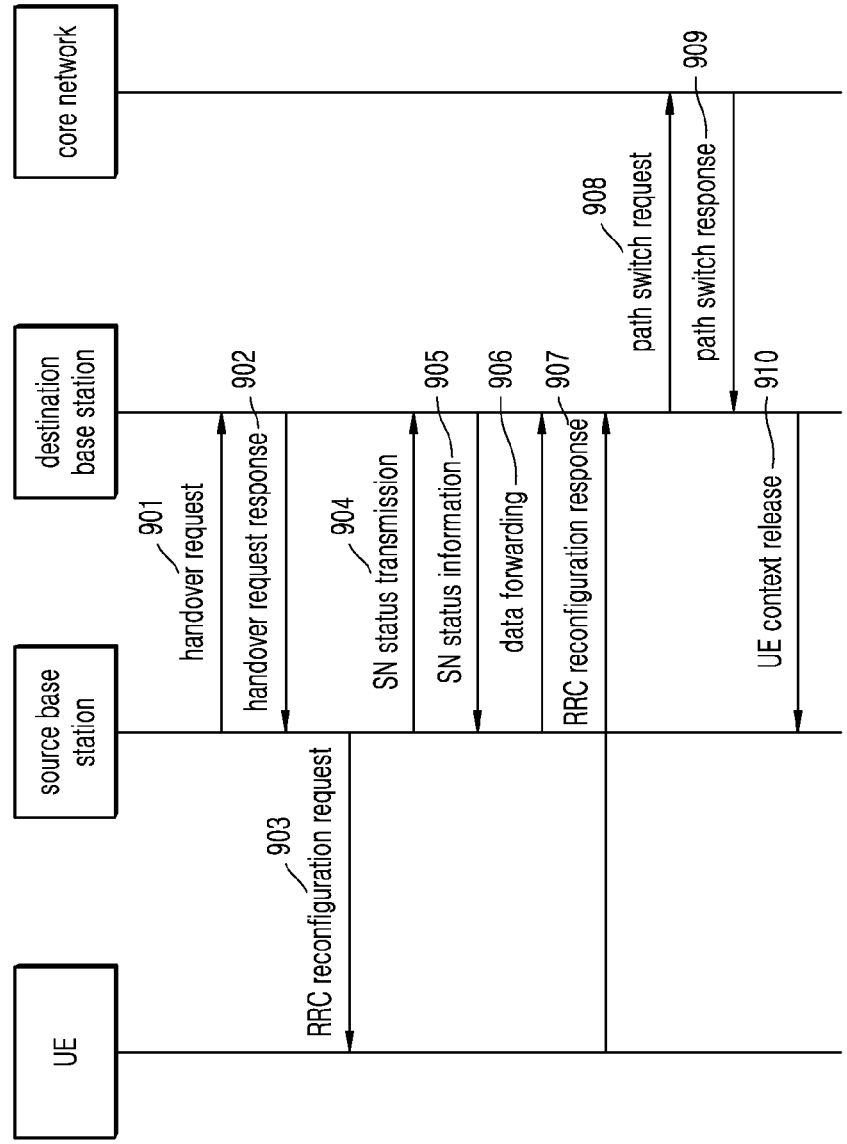
FIG. 9 illustrates a schematic diagram of Embodiment 5 according to various embodiments of the present disclosure.

FIG. 9 illustrates a schematic diagram of Embodiment 5 according to various embodiments of the present disclosure.

When the UE is handed over, another embodiment of Method 1 on how to maintain service continuity is described, as shown in FIG. 9 (Embodiment 5). When the UE moves from the source base station to the destination base station, if the UE is receiving an MBS at the source base station, when the UE moves to the destination base station, the UE also needs to continue receiving the MBS. In the handover procedure, it is better that there is no loss of the MBS data, so that the UE can receive data continuously. For a unicast service, when the UE moves to the destination base station, the core network may stop sending data to the source base station and notify the source base station that the data sending is stopped, and a certain data packet is identified as the last data packet, indicating that the data sending is stopped.

However, for an MBS service, the destination base station may have already sent data in the point-to-multipoint transmission mode, and the source base station also needs to continue transmission of the MBS, and may not end data transmission just because a UE moves away. Therefore, the source base station continues receiving data from the core network, and it is impossible to get the indication that the data is suspended from the core network, so the source base station does not know when the source base station is needed to end the data forwarding. According to this embodiment, when the source base station receives the SN information sent by the destination base station, the source base station can forward the data packets that have not been sent by the destination base station to the destination base station according to the information, and decide when to end the data forwarding, which can reduce the data forwarding and ensure the continuous sending and reception of the data. Embodiment 5 describes the procedure, and detailed description of steps unrelated to the present disclosure is omitted here. Embodiment 5 contains the following steps.

At step 901, a source base station initiates a handover request message to a destination base station.

The message carries the session identifier of each PDU session requested, information of the QoS flow contained in the PDU session, DRB information, etc. If the UE is receiving an MBS, the message also contains the identifier of the MBS, a forwarding proposal for an MBS service, or a forwarding proposal set for a radio bearer of each MBS, the message also contains the session identifier corresponding to the MBS, the information of the QoS flow corresponding to the MBS, the configuration information of the DRB transmitting the MBS, etc. and the mapping configuration information of the QoS flow to the MRB of the MBS at the source base station. The message may also contain the SN information of the MBS data sent by the source base station, and the SN information may contain SN of PDCP and/or SN of GTP-U.

In one example, PDCP SN, specifically, can be one or several of the following information:
- the PDCP SN list corresponding to downlink PDCP data packets that have been sent to the lower RLC layer;
- the highest PDCP SN corresponding to downlink PDCP data packets that have been sent to the lower RLC layer;
- the PDCP SN list corresponding to downlink PDCP data packets that have been successfully sent to the UE in sequence;
- the highest PDCP SN corresponding to downlink PDCP data packets that have been successfully sent to the UE in sequence;

the PDCP SN list corresponding to downlink PDCP data packets that have been successfully sent to the UE; and/or the highest PDCP SN corresponding to downlink PDCP data packets that have been successfully sent to the UE;

In one example, GTP-U SN, specifically, can be one or several of the following information:

the highest SN of GTP-u data packet corresponding to data packets sent to the PDCP layer;

the highest SN of GTP-u data packet corresponding to data packets sent to the SDAP layer;

the SN corresponding to the highest sequence number in the received GTP-u data packets;

the SN list of GTP-U data packets corresponding to downlink PDCP data packets that have been sent to the lower RLC layer;

the SN in the header of the GTP-U data packet with the highest sequence number corresponding to downlink PDCP data packets that have been sent to the lower RLC layer;

the SNs in the headers of GTP-U data packets corresponding to downlink PDCP data packets that have been successfully sent to the UE in sequence;

the SN in the header of the GTP-U data packet with the highest sequence number corresponding to downlink PDCP data packets successfully sent to the UE in sequence;

the SNs in the headers of GTP-U data packets corresponding to downlink PDCP data packets successfully sent to the UE; and/or the SN in the header of the GTP-U data packet with the highest sequence number corresponding to downlink PDCP data packets successfully sent to the UE.

According to whether the destination cell is already transmitting the MBS, the destination base station decides whether to send a message to the core network to request the transmission of the MBS data. If the destination cell has received the MBS from the core network, the destination base station sends a response message to the source base station.

If the destination cell on the destination base station has not received the MBS data from the core network, the destination base station sends a message to the core network to request the core network to send the MBS data. The procedure of establishing an MBS bearer has already been described in other embodiments. The destination base station sends the response message to the source base station.

At step 902, the destination base station sends a handover request response message. The message includes a transparent transmitter from destination to source. The transparent transmitter from destination to source contains the RRC message sent by the destination base station to the UE.

The message also contains the information of the PDU session established successfully. The information of the PDU session contains the identifier of the PDU session, the identifier of the DRB established successfully, the identifier of the MBS established successfully, and the identifier of the MRB established successfully. If the destination base station is transmitting the MBS services in point-to-point transmission or point-to-multipoint transmission, the message also contains indication information that the destination base station decides that the MBS data forwarding is needed.

At step 903, the source base station sends a handover execution command to the UE through a RRC reconfiguration message.

The message carries the information of the configuration of the PDU session that needs UE to establish at the destination base station. The message can also contain the MBS service identifier and channel mode indication information of the MBS received at the destination base station, and can also contain the point-to-point channel configuration information and/or point-to-multipoint channel configuration information of the MBS.

At step 904, the source base station sends the SN status transmission to the destination base station.

If the information of the PDCP SN corresponding to the MBS data received by the UE at the source base station is not contained in step 901, the PDCP SN and/or the SN of GTP-U corresponding to the MBS data can be sent through a separate message by step 904.

In one example, PDCP SN, specifically, can be one or several of the following information:

the PDCP SN list corresponding to downlink PDCP data packets that have been sent to the lower RLC layer;

the highest PDCP SN corresponding to downlink PDCP data packets that have been sent to the lower RLC layer;

the PDCP SN list corresponding to downlink PDCP data packets that have been successfully sent to the UE in sequence;

the highest PDCP SN corresponding to downlink PDCP data packets that have been successfully sent to the UE in sequence;

the PDCP SN list corresponding to downlink PDCP data packets that have been successfully sent to the UE; and/or the highest PDCP SN corresponding to downlink PDCP data packets that have been successfully sent to the UE.

In one example, GTP-U SN, specifically, can be one or several of the following information:

the highest SN of GTP-u data packet corresponding to data packets sent to the PDCP layer;

the highest SN of GTP-u data packet corresponding to data packets sent to the SDAP layer;

the corresponding SN with the highest sequence number in the received GTP-u data packets; the SN list of GTP-U data packets corresponding to downlink PDCP data packets that have been sent to the lower RLC layer;

the SN in the header of the GTP-U data packet with the highest sequence number corresponding to downlink PDCP data packets that have been sent to the lower RLC layer;

the SNs in the headers of GTP-U data packets corresponding to downlink PDCP data packets that have been successfully sent to the UE in sequence;

the SN in the header of the GTP-U data packet with the highest sequence number corresponding to downlink PDCP data packets successfully sent to the UE in sequence;

the SNs in the headers of GTP-U data packets corresponding to downlink PDCP data packets successfully sent to the UE; and/or the SN in the header of the GTP-U data packet with the highest sequence number corresponding to downlink PDCP data packets successfully sent to the UE.

At step 905, the destination base station sends the SN status information to the source base station.

The message may contain the SN information corresponding to data that has been sent or is being sent by the destination base station at present, or PDCP SN information and/or SN of GTP-U corresponding to the forwarded data proposed by the destination base station. For example, if GTP-u SN being sent by the destination base station is 100, the destination base station notifies the source base station that the GTP-u SN being sent is 100, and the source base station only forwards data with GTP-u SN less than 100. Or, in order to ensure that the data is not lost, the destination base station notifies the source base station that the highest GTP-u SN corresponding to the data proposed to be forwarded is 110, and then the source base station only forwards the data with GTP-u SN less than 110. The destination base station can establish a point-to-point channel for the UE to receive the MBS data, and wait for all the forwarded data to be sent to the UE. If necessary, let the UE switch to point-to-multipoint to receive the data.

Specifically, the SN information of PDCP and/or the SN information of GTP-U may be one or several of the following information:

the PDCP SN list corresponding to downlink PDCP data packets that have been sent to the lower RLC layer;

the highest PDCP SN corresponding to downlink PDCP data packets that have been sent to the lower RLC layer;

the PDCP SN list corresponding to downlink PDCP data packets that have been successfully sent to the UE in sequence;

the highest PDCP SN corresponding to downlink PDCP data packets that have been successfully sent to the UE in sequence;

the PDCP SN list corresponding to downlink PDCP data packets that have been successfully sent to the UE;

the highest PDCP SN corresponding to downlink PDCP data packets that have been successfully sent to the UE;

the PDCP SN set by the base station, which indicates the highest PDCP SN corresponding to the downlink PDCP data packets needed to be forwarded; and/or the PDCP SN list set by the base station, which indicates the PDCP SN list corresponding to the downlink PDCP data packets needed to be forwarded, and may also indicate a range of SNs, for example, indicate the lowest and highest PDCP SNs.

In one example, GTP-U SN, specifically, can be one or several of the following information:

the highest SN of GTP-u data packet corresponding to data packets sent to the PDCP layer;

the highest SN of GTP-u data packet corresponding to data packets sent to the SDAP layer;

the corresponding SN with the highest sequence number in the received GTP-u data packets; the SN list of GTP-U data packets corresponding to downlink PDCP data packets that have been sent to the lower RLC layer;

the SN in the header of the GTP-U data packet with the highest sequence number corresponding to downlink PDCP data packets that have been sent to the lower RLC layer;

the SNs in the headers of GTP-U data packets corresponding to downlink PDCP data packets that have been successfully sent to the UE in sequence;

the SN in the header of the GTP-U data packet with the highest sequence number corresponding to downlink PDCP data packets successfully sent to the UE in sequence;

the SNs in the headers of GTP-U data packets corresponding to downlink PDCP data packets successfully sent to the UE;

the SN in the header of the GTP-U data packet with the highest sequence number corresponding to downlink PDCP data packets successfully sent to the UE;

the GTP-U SN set by the base station, which indicates the highest GTP-U SN corresponding to the downlink data packets needed to be forwarded; and/or the GTP-U SN list set by the base station, which indicates the GTP-U list corresponding to the downlink data packets needed to be forwarded, and may also indicate a range of SNs, for example, indicate the lowest and highest GTP-U SNs.

Step 905 does not necessarily occur after step 904, but may also occur before step 904. There is no absolute order between them.

At step 906, the source base station forwards the MBS data to the destination base station. According to the received SN information corresponding to the forwarded data proposed by the destination base station (SN information can be PDCP SN or GTP-u SN, as described above), the source base station decides which data need to be forwarded and when to end forwarding. For example, the destination base station proposes that the highest GTP-u SN of the forwarded data is set to 100, and the source base station is currently sending the data packet GTP-u SN 80, so the source base station forwards data packets from GTP-u SN=80 to SN=100 to the destination base station. In order to ensure the continuous reception of data, the destination base station can temporarily establish a point-to-point transmission mode for the UE and send the forwarded data to the UE through the point-to-point channel. After that, the UE can switch to the point-to-multipoint mode to receive data. When the data forwarding ends, the source base station can indicate the end of the data forwarding on the user plane, or indicate that the forwarded data packet is the last data packet.

At step 907, the UE sends an RRC reconfiguration complete message to the destination base station to indicate that the handover is completed.

At step 908, the destination base station sends a path switch request message to the core network.

When the UE is the first user that needs to receive the MBS of the destination base station and the destination base station has not received the MBS data from the core network, the destination base station can request the transmission of the MBS data through the message of step 908. The message of step 908 carries the information of MBS, such as the identifier of MBS, and requests the core network to send the MBS data to the base station. In response to receiving the message of step 908, the core network starts sending a service start message of the MBS to the base station, and the base station sends a response message to the core network, after which the core network can start sending the MBS data to the base station. The destination base station first sends the forwarded data received from the source base station, and then sends the new data received from the core network.

At step 909, the core network sends a path switch response message to the destination base station.

At step 910, the destination base station sends a UE context release message to the source base station to release the context information of the UE on the source base station.

The method shown in this embodiment may also be used for a user separation architecture. At this time, the destination CU-UP needs to contain, in the bearer establishment response or bearer modification response message, the SN information corresponding to data that has been sent or is being sent by the destination CU-UP, or the SN information of PDCP and/or SN information of GTP-U corresponding to the forwarded data proposed by the destination base station. For specific information, see step 905. After receipt of those, the destination CU-CP sends the SN information as described above to the source CU-CP, and the source CU-CP sends the SN information to the source CU-UP. According to the received SN information (SN information can be PDCP SN or GTP-u SN), the source CU-UP decides which data need to be forwarded and when to end forwarding. When the data forwarding ends, the source CU-UP may indicate that the data forwarding ends on the user plane, or indicate that the forwarded data packet is the last data packet.

The above embodiments all need to enhance the messages/procedures between the source base station and the destination base station. In Embodiment 6, a method using time-based data transmission based on not modifying the messages/procedures between the source base station and the destination base station, or a method without adding messages is proposed. The advantage of this method is that the impact on the protocol is minimal, and the disadvantage is that the forwarded data may be more or less than the data actually needed. Specifically, Embodiment 6 of FIG. 11 includes the following steps.

At step 1101, a source base station initiates a handover request message to a destination base station.

Based on the measurement report of the UE, the source base station decides to hand the UE over to the destination base station where the destination cell is located. When the source base station decides to initiate the handover procedure, the source base station starts to save/buffer the data that has not been sent to the UE at this time, and also saves/buffers the data newly received from the core network. These data are all the data to be forwarded to the destination base station. The buffering starts from the time when the handover is initiated, and ends when the source base station receives the release request message sent by the destination base station, or ends at a certain time point after receipt of the release request message sent by the destination base station, which can be implementation-related.

The message carries the session identifier of each PDU session requested, information of the QoS flow contained in the PDU session, DRB information, etc. If the UE is receiving an MBS, the message also contains the identifier of the MBS, a forwarding proposal for an MBS service, or a forwarding proposal set for a radio bearer of each MBS, the message also contains the session identifier corresponding to the MBS, the information of the QoS flow corresponding to the MBS, the configuration information of the DRB transmitting the MBS, etc. and the mapping configuration information of the QoS flow to the MRB of the MBS at the source base station.

The message may also contain the PDCP SN corresponding to the MBS data transmission of the source base station and the SN of the corresponding GTP-U, and the specific contents are as described in Embodiments 1 to 6. The GTP-U SN is the sequence number contained in the data packet sent by the core network to the base station, and can be contained in the header of the GTP-U or the extended header of the GTP-U. This SN can be for a PDU session, a QoS flow, or multiple QoS flows, for example, multiple QoS flows mapped onto the same radio bearer. For the same data packet, the GTP-U SNs sent to different base stations are the same, so the destination base station can know the PDCP SN assigned by the source base station for a data packet of the same GTP-U SN, and thus can know the difference between the PDCP SN assigned by the destination base station and the PDCP SN assigned by the source base station, which is called PDCP SN difference.

According to whether the destination cell is already transmitting the MBS, the destination base station decides whether to send a message to the core network to request the transmission of the MBS data. A new message, which carries the information of MBS, such as the identifier of MBS, can be sent to the core network to request the core network to send the MBS data to the base station. If the destination cell has received the MBS from the core network, the destination base station sends a response message to the source base station.

If the destination cell on the destination base station has not received the MBS data from the core network, the destination base station sends a message to the core network to request the core network to send the MBS data. After that, the destination base station sends the response message to the source base station.

At step 1102, the destination base station sends a handover request response message. The message includes a transparent transmitter from destination to source. The transparent transmitter from destination to source contains the RRC message sent by the destination base station to the UE. In the RRC message, the PDCP SN difference mentioned in step 1101 may be contained, or the correspondence between the PDCP SN and the GTP-U SN of the destination base station may be contained, since for a data packet corresponding to the same GTP-U SN, different PDCP SNs may be assigned by the source base station and the destination base station, and for the data received by the UE from the source base station and the data received by the UE the destination base station in the procedure of handover, PDCP SNs may be discontinuous. The PDCP protocol layer at UE side needs to transmit data packets to the upper layer protocol in order of SN, and needs to judge whether there is data loss according to PDCP SNs. If the UE gets the PDCP SN difference, the UE can know according to the difference whether the data packet received from the destination base station is continuous with the data packet received from the source base station. According to the difference, data packets can be sorted. If the data packets are not continuous, the UE can know which data packets are lost, so the UE can request the destination base station to retransmit the lost data packets.

The message also contains the information of the PDU session established successfully. The information of the PDU session contains the identifier of the PDU session, the identifier of the DRB established successfully, the identifier of the MBS established successfully, the identifier of the MRB established successfully, and a tunnel address for receiving data forwarding.

At step 1103, the source base station sends a handover execution command to the UE through a RRC reconfiguration message.

The message carries the information of the configuration of the PDU session that needs UE to establish at the destination base station. The message can also contain the MBS service identifier and channel mode indication information of the MBS received at the destination base station, and can also contain the point-to-point channel configuration information and/or point-to-multipoint channel configuration information of the MBS.

At step 1104, the source base station sends the SN status transmission to the destination base station.

The message contains the PDCP SN and/or the SN of GTP-U corresponding to the MBS data. The specific content is as described in Embodiments 1 to 6.

At step 1105, the source base station forwards the MBS data to the destination base station.

The source base station sends the saved data to the destination base station.

Optionally, when the data forwarding ends, the source base station can indicate the end of the data forwarding on the user plane, or indicate that the forwarded data packet is the last data packet.

At step 1106, the UE sends an RRC reconfiguration complete message to the destination base station to indicate that the handover is completed.

At step 1107, the destination base station sends a path switch request message to the core network.

When the UE is the first user that needs to receive the MBS of the destination base station and the destination base station has not received the MBS data from the core network, the destination base station can request the transmission of the MBS data through the message of step 1107. The message of step 1107 carries the information of MBS, such as the identifier of MBS, and requests the core network to send the MBS data to the base station. In response to receiving the message of step 1107, the core network starts sending a service start message of MBS to the base station, and the base station sends a response message to the core network, after which the core network can start sending the MBS data to the base station. The destination base station first sends the forwarded data received from the source base station, and then sends the new data received from the core network.

At step 1108, the core network sends a path switch response message to the destination base station.

At step 1109, the destination base station sends a UE context release message to the source base station to release the context information of the UE on the source base station.

This message can carry the indication information that the data forwarding is stopped. The destination base station receives the data forwarded by the source base station, and the destination base station decides whether the source base station needs to continue forwarding data to the destination base station according to the data received from the core network by itself and the situation of the MBS data buffered by itself. If the source base station does not need, when the destination base station sends the UE context release message to the source base station, the UE context release message carries the indication information of stopping data forwarding, or contains the information of SN of data forwarding. The SN information may be PDCP SN and/or SN of GTP-U corresponding to the MBS data, and the specific content is as described in Embodiments 1 to 6. Or the destination base station waits until the source base station does not need to continue forwarding data to the destination base station, and then sends the UE context release message to the source base station. Upon receiving the UE context release message, the source base station stops data forwarding. When the data forwarding is stopped, it can be indicated in the forwarded data packet that the data forwarding ends or that the forwarded data packet is the last data packet.

If the source base station receives the indication information that the data forwarding is stopped contained in the UE context release message, the source base station may stop forwarding data to the destination base station. It can be indicated in the forwarded data packet that the data forwarding ends or that the forwarded data packet is the last data packet.

If the source base station receives the SN information contained in the UE context release message, the source base station decides when the data forwarding is stopped according to the information of SN, and it can be indicated in the forwarded data packet that the data forwarding ends or that the forwarded data packet is the last data packet.

In MBS transmission, in order to ensure data continuity and minimize data loss during handover, it is necessary to synchronize PDCP SN between multiple base stations. There are two synchronization methods for synchronizing PDCP SN and GTP-U SN, one is that the value of PDCP SN is equal to that of GTP-U SN, the other is that the value of PDCP SN can be different from that of GTP-U SN, but with a fixed rule, PDCP SN is generated from GTP-U SN. For example, GTP-U SN corresponding to PDCP SN=0 is 10, GTP-U SN corresponding to PDCP SN=1 is 11, and so on.

Some base stations receive data from the core network late. For example, in the procedure of service, a user who is receiving an MBS or needs to receive the MBS move to a cell supporting the MBS service. The base station where the cell is located has not received the MBS service from the core network, and the base station requests the core network to send the service. At this time, the core network sends data to the base station. The SN contained in the header of the GTP-U contained in the first data packet received by this base station is 100. At this time, other base stations receiving the MBS service at the beginning of the service set PDCP SN according to SN contained in the header of the GTP-U. For data packets that the SN contained in the header of the GTP-U is 100, PDCP SN=100. For base stations receiving data later, the serial number of PDCP SN needs to be numbered from 1 according to current regulations. In this way, the problem that PDCP SNs are out of sync occurs.

Multiple base stations receive data of the same MBS service from the core network, and data loss may occur in the procedure of transmission from the core network to the base stations. For example, two base stations, i.e., base station 1 and base station 2, both receive data of the same MBS service from the core network, and a data packet is lost in the procedure of being sent to the base station 1, while data packets sent to the base station 2 are not lost. In this case, if the PDCP SN of the base station is synchronized with the SN of the GTP-U, in case of data loss, an out-of-sync situation occurs.

When the above situation occurs, the relationship between the PDCP SN and the GTP-U SN is broken. In this case, resynchronization is performed by the following methods.

Method 1: the PDCP sequence number of the base station can start from SN contained in the header of the first received GTP-U data packet instead of 1. For example, when the SN carried in the header of the first GTP-U data packet received by the base station is 100, PDCP SN=100. At this time, the base station needs to tell the UE that PDCP SN=100 is the first data packet or notify the UE of the starting value of the PDCP SN through PDCP header or PDCP control information.

Method 2: through the GTP-U SN, the base station can know that there is data loss. The GTP-U SN can be for a Session or a QoS flow, and is continuously encoded at the core network, so from the GTP-U SN, the base station can know whether there is data loss. If it is found that there is data loss, the base station can generate a fake PDCP data packet and assign a PDCP SN to the fake data packet to ensure that the PDCP SN and the GTP-U SN are synchronized.

Method 3: the base station knows that there is data loss, but the base station still assigns PDCP SN according to GTP-U SN. For example, if the first synchronization mode is adopted, i.e., GTP-U SN=PDCP SN, the base station receives a data packet with GTP-U SN=9, and assigns PDCP SN=9 to the data packet. If the data packet with GTP-U SN=10 is lost in the procedure of transmission from the core network to the base station, the base station receives the data packet with GTP-U SN=11 instead of the data packet with GTP-U SN=10, and the corresponding PDCP SN directly goes from 9 to 11, so the PDCP SN contained in the data packet sent by the base station is discontinuous. The UE side needs to sort the data according to the PDCP SN. If the UE does not receive PDCP SN=10, the UE may think that the data packet with PDCP SN=10 has not been sent successfully, and may require the base station to retransmit. To avoid this situation, the base station can notify the UE that PDCP SN 10 is no longer transmitted, and the next continuously received PDCP SN is 11. The UE may be notified through the RRC message sent by the base station, for example, is notified of the lost PDCP SN number, or the UE is told through the control information of the user plane, for example, in the control information contained in the data packet with PDCP SN=11, the UE is notified that the SN number of the data packet previous to the data packet is PDCP SN=9. In this way, the UE may not think that the data packet with PDCP SN=10 is lost so as to request the base station to retransmit.

Method 4: when the base station generates PDCP SN from GTP-U SN with a fixed rule, if there is data loss, the base station may adopt a new rule, and then notify the new rule to the UE through a RRC message or to other base stations through an Xn interface. For example, before the data is lost, the base station receives a data packet with GTP-U=10, and assigns PDCP SN=1. The rule is PDCP SN=GTP-U SN−9. When the data packet with GTP-U=11 is lost, the base station receives a data packet with GTP-U=12, and assigns PDCP SN=2 for the data packet. The new rule is PDCP SN=GTP-U SN−10. The neighboring base stations are notified of the new rule, for example, the information of {PDCP SN=2, GTP-U SN=10}, by the method of Embodiment 6 or through a new message.

According to the method of the disclosure, when the multicast transmission is switched, it is possible to ensure service continuity, avoid or reduce the extra overhead of the multicast data transmission, improve the utilization efficiency of the access network resources and/or air interface resources, and reduce the transmission delay, the loss of data, the delay caused by switching, and unnecessary data transmission.

Figure 10:
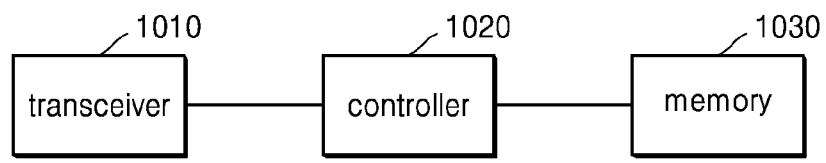
FIG. 10 illustrates a block diagram of a network device according to various embodiments of the present disclosure.
Figure 11:
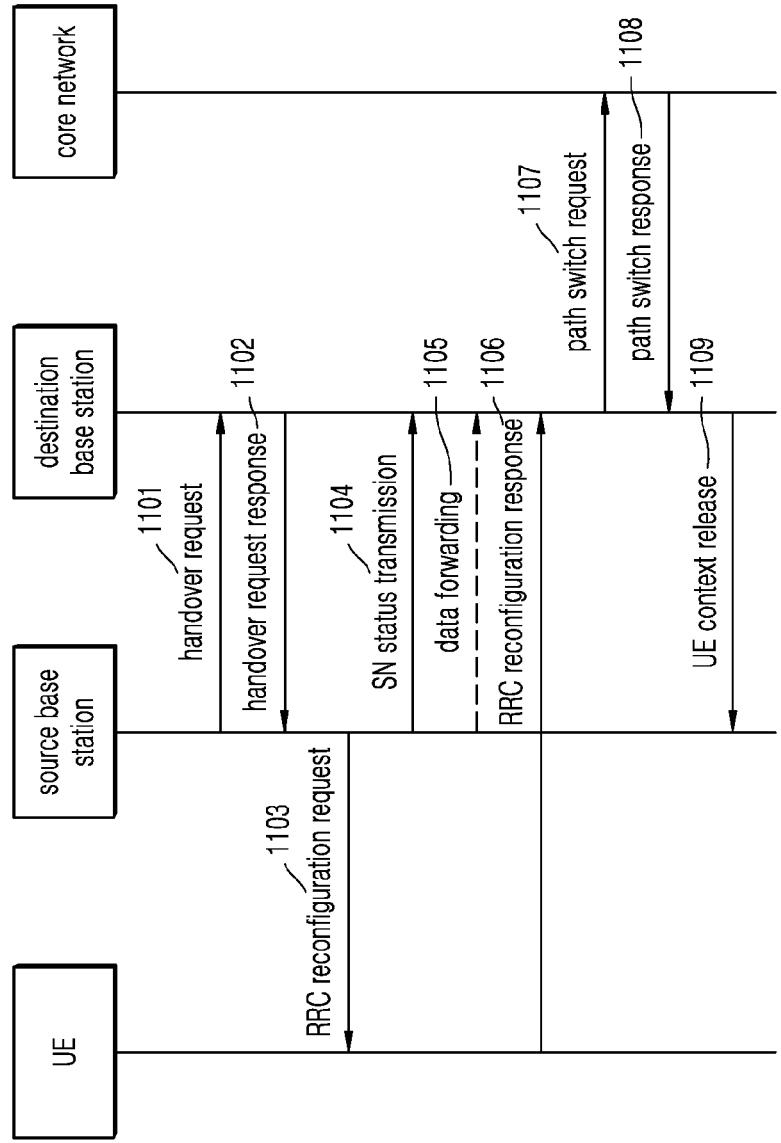
FIG. 11 illustrates a schematic diagram according to various embodiments of Embodiment 6 of the present disclosure.

FIG. 10 illustrates a block diagram of a network device according to various embodiments of the present disclosure.

The network device can be used to realize the DU, the CU-UP, the CU-CP, the base station, the source base station, the destination base station, the source DU, the source CU-UP, the source CU-CP, the destination DU, the destination CU-UP, the destination CU-CP, etc. of the present disclosure. Referring to FIG. 10, a network device according to the present disclosure includes a transceiver 1010, a controller 1020 (or at least one processor) and a memory 1030. The transceiver 1010, the controller 1020 and the memory 1030 are configured to perform the operations of Embodiments 1 to 5 of the present disclosure. Although the transceiver 1010, the controller 1020, and the memory 1030 are shown as separate entities, the transceiver 1010, the controller 1020, and the memory 1030 may be implemented as a single entity, such as a single chip. The transceiver 1010, the controller 1020 and the memory 1030 may be electrically connected or coupled to each other. The transceiver 1010 can send signals to and receive signals from other network device, such as a UE, a base station or a core network node. The controller 1020 may include one or more processing units, and may control network devices to perform operations and/or functions according to one of the above embodiments. The memory 1030 may store instructions for implementing operations and/or functions of one of the above embodiments.

So far, the method and device for multicast transmission of the present disclosure is finished. When the multicast transmission is switched, it is possible to ensure service continuity, avoid or reduce the extra overhead of the multicast data transmission, improve the utilization efficiency of the access network resources and/or air interface resources, and reduce the transmission delay, the loss of data, the delay caused by switching, and unnecessary data transmission.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for a multicast broadcast service (MBS) during a handover from a second network device to a first network device, the method performed by the first network device and comprising:
    receiving a handover request message from the second network device, wherein the handover request message includes a first packet data convergence protocol (PDCP) sequence number (SN) of a first data packet that has been delivered to a user equipment (UE) for the MBS and identifier information of a radio bearer for the MBS;
    determining whether to apply data forwarding for the MBS, based on the first PDCP SN of the first data packet that has been delivered to the UE for the MBS; and
    transmitting a handover request response message to the second network device, wherein the handover request response message includes a second PDCP SN of a second data packet that is available at the first network device for the MBS, and wherein the second PDCP SN enables the second network device to determine when to stop the data forwarding for the MBS.

2. The method of claim 1, wherein the first PDCP SN includes a highest PDCP SN of a data packet among data packets that have been successfully sent to the UE for the MBS.

3. The method of claim 1, wherein the handover request response message further includes the identifier information of the radio bearer for the MBS.

4. The method of claim 1, wherein the second PDCP SN includes a PDCP SN of a data packet that is sent to the UE by the first network device for the MBS.

5. A method for a multicast broadcast service (MBS) during a handover from a second network device to a first network device, the method performed by the second network device and comprising:
    transmitting a handover request message to the first network device, wherein the handover request message includes a first packet data convergence protocol (PDCP) sequence number (SN) of a first data packet that has been delivered to a user equipment (UE) for the MBS and identifier information of a radio bearer for the MBS;
    receiving a handover request response message from the first network device, wherein the handover request response message includes a second PDCP SN of a second data packet that is available at the first network device for the MBS; and determining when to stop data forwarding for the MBS, based on the second PDCP SN of the second data packet that is available at the first network device for the MBS.

6. The method of claim 5, wherein the first PDCP SN includes a highest PDCP SN of a data packet among data packets that have been successfully sent to the UE for the MBS.

7. The method of claim 5, wherein the handover request response message further includes the identifier information of the radio bearer for the MBS.

8. The method of claim 5, wherein the second PDCP SN includes a PDCP SN of a data packet that is sent to the UE by the first network device for the MBS.

9. The method of claim 5, wherein the first PDCP SN enables the first network device to determine whether to apply the data forwarding for the MBS.

10. A first network device for a multicast broadcast service (MBS) during a handover from a second network device to the first network device, the first network device comprising:
    a transceiver; and
    at least one processor coupled to the transceiver and configured to:
        receive a handover request message from the second network device, wherein the handover request message includes a first packet data convergence protocol (PDCP) sequence number (SN) of a first data packet that has been delivered to a user equipment (UE) for the MBS and identifier information of a radio bearer for the MBS,
        determine whether to apply data forwarding for the MBS, based on the first PDCP SN of the first data packet that has been delivered to the UE for the MBS, and
        transmit a handover request response message to the second network device, wherein the handover request response message includes a second PDCP SN of a second data packet that is available at the first network device for the MBS, and wherein the second PDCP SN enables the second network device to determine when to stop the data forwarding for the MBS.

11. The first network device of claim 10, wherein the first PDCP SN includes a highest PDCP SN of a data packet among data packets that have been successfully sent to the UE for the MBS.

12. The first network device of claim 10, wherein the handover request response message further includes the identifier information of the radio bearer for the MBS.

13. The first network device of claim 10, wherein the second PDCP SN includes a PDCP SN of a data packet that is sent to the UE by the first network device for the MBS.

14. A second network device for a multicast broadcast service (MBS) during a handover from the second network device to a first network device, the second network device comprising:
    a transceiver; and
    at least one processor coupled to the transceiver and configured to:
        transmit a handover request message to the first network device, wherein the handover request message includes a first packet data convergence protocol (PDCP) sequence number (SN) of a first data packet that has been delivered to a user equipment (UE) for the MBS and includes identifier information of a radio bearer for the MBS,
        receive a handover request response message from the first network device, wherein the handover request response message includes a second PDCP SN of a second data packet that is available at the first network device for the MBS, and
        determine when to stop data forwarding for the MBS, based on the second PDCP SN of the second data packet that is available at the first network device for the MBS, wherein the second PDCP SN enables the second network device to determine when to stop the data forwarding for the MBS.

15. The second network device of claim 14, wherein the first PDCP SN includes a highest PDCP SN of a data packet among data packets that have been successfully sent to the UE for the MBS.

* * * * *